Nov. 4, 1947.  R. PEALE ET AL  2,430,364
APPARATUS FOR MINING AND LOADING COAL
Filed Aug. 30, 1944   10 Sheets-Sheet 2
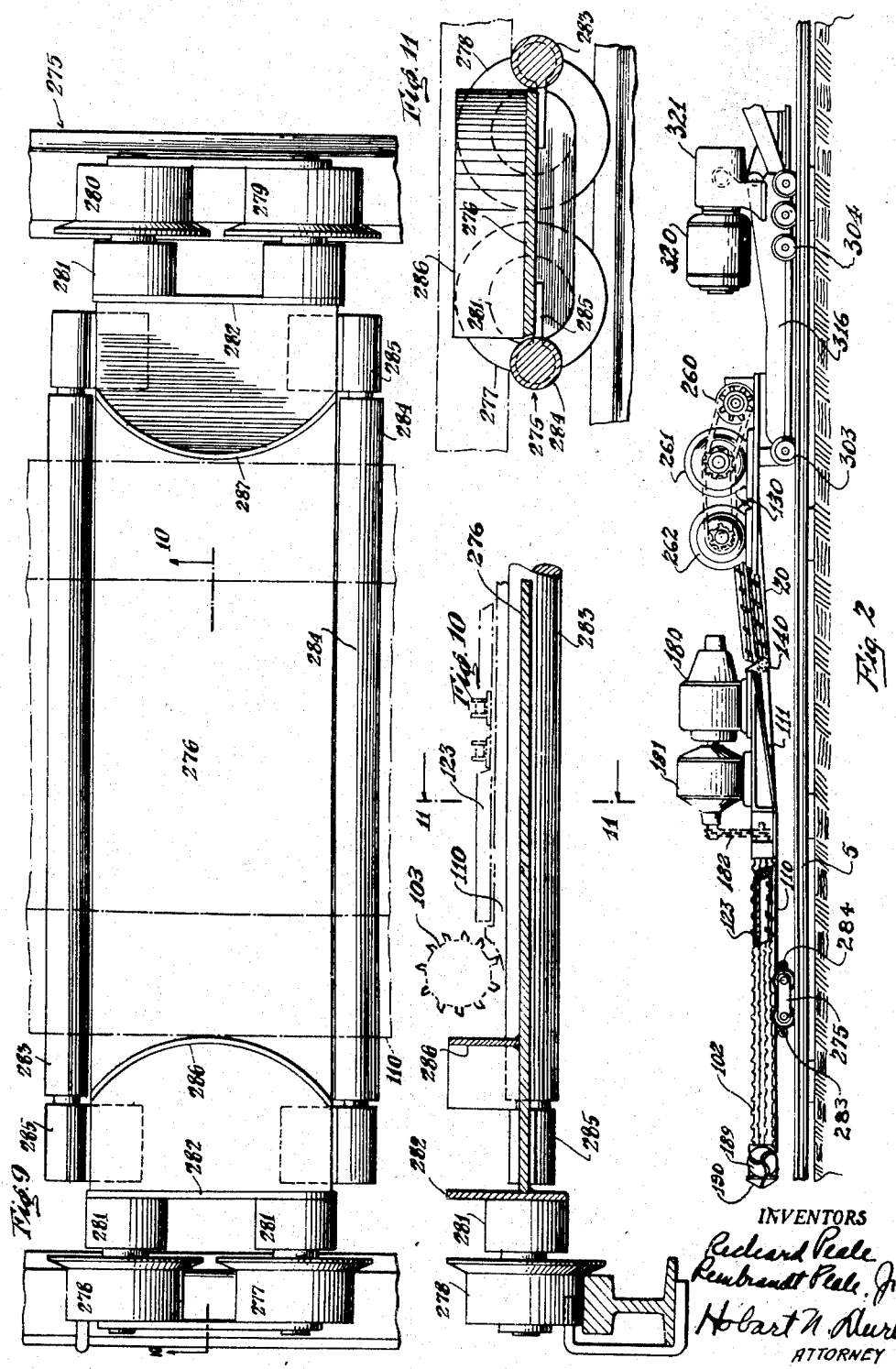

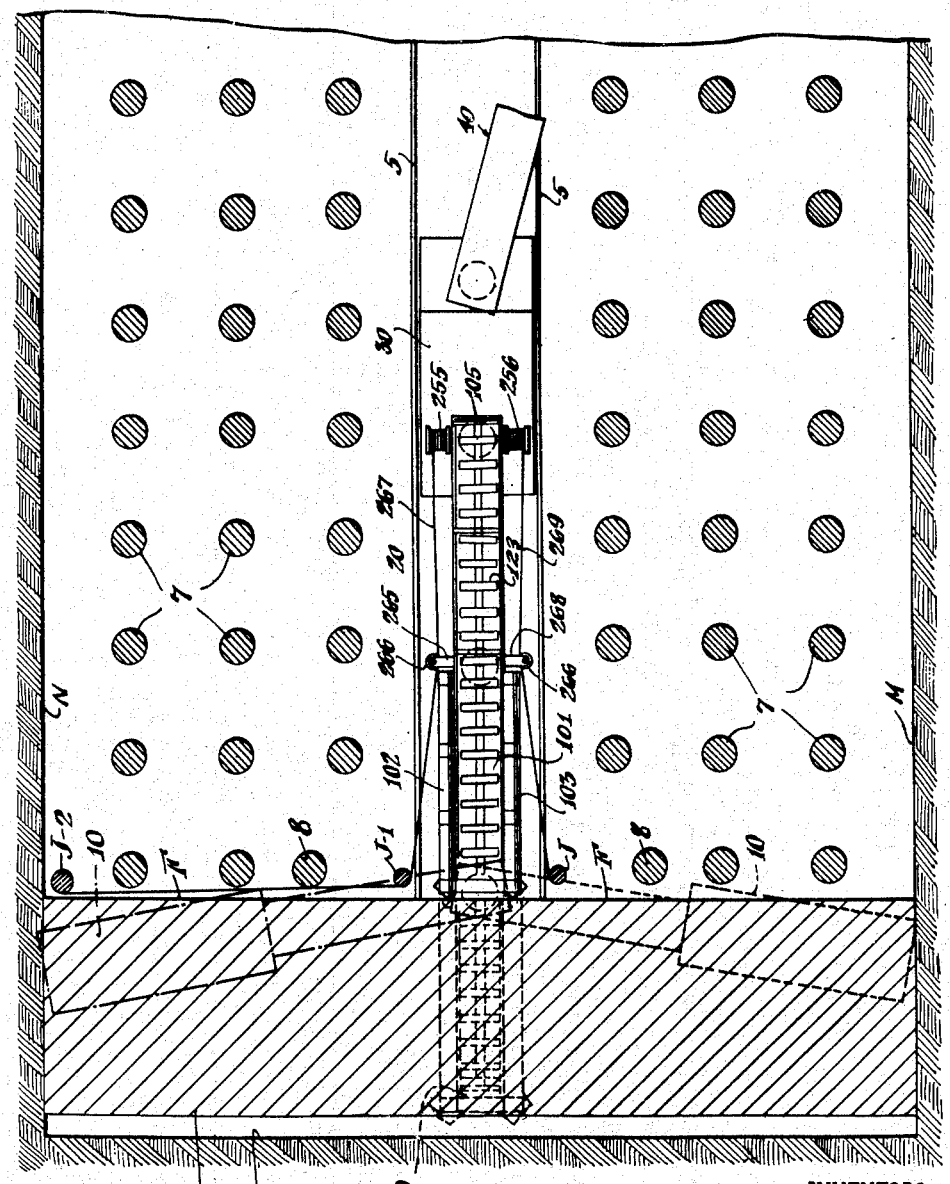

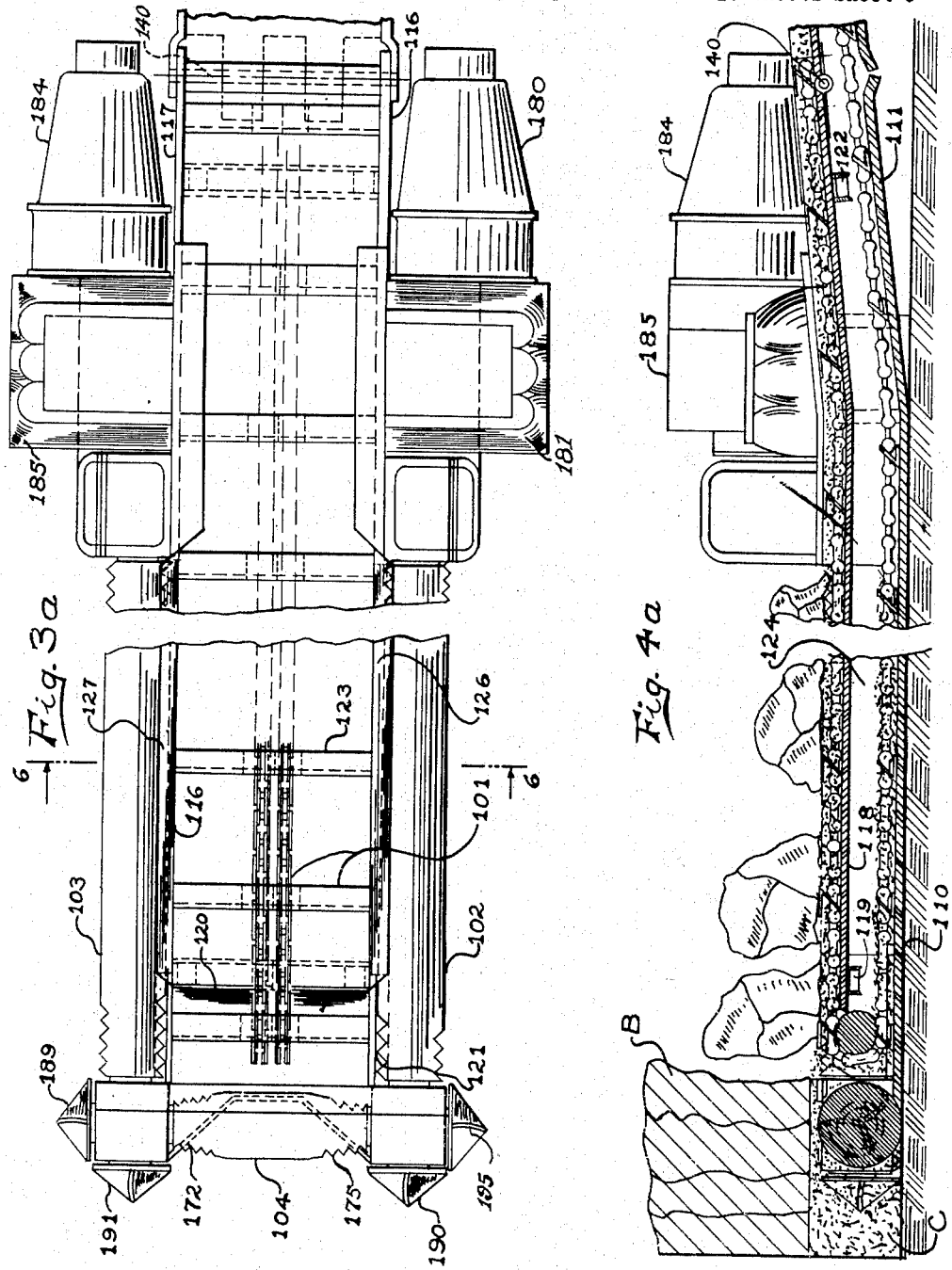

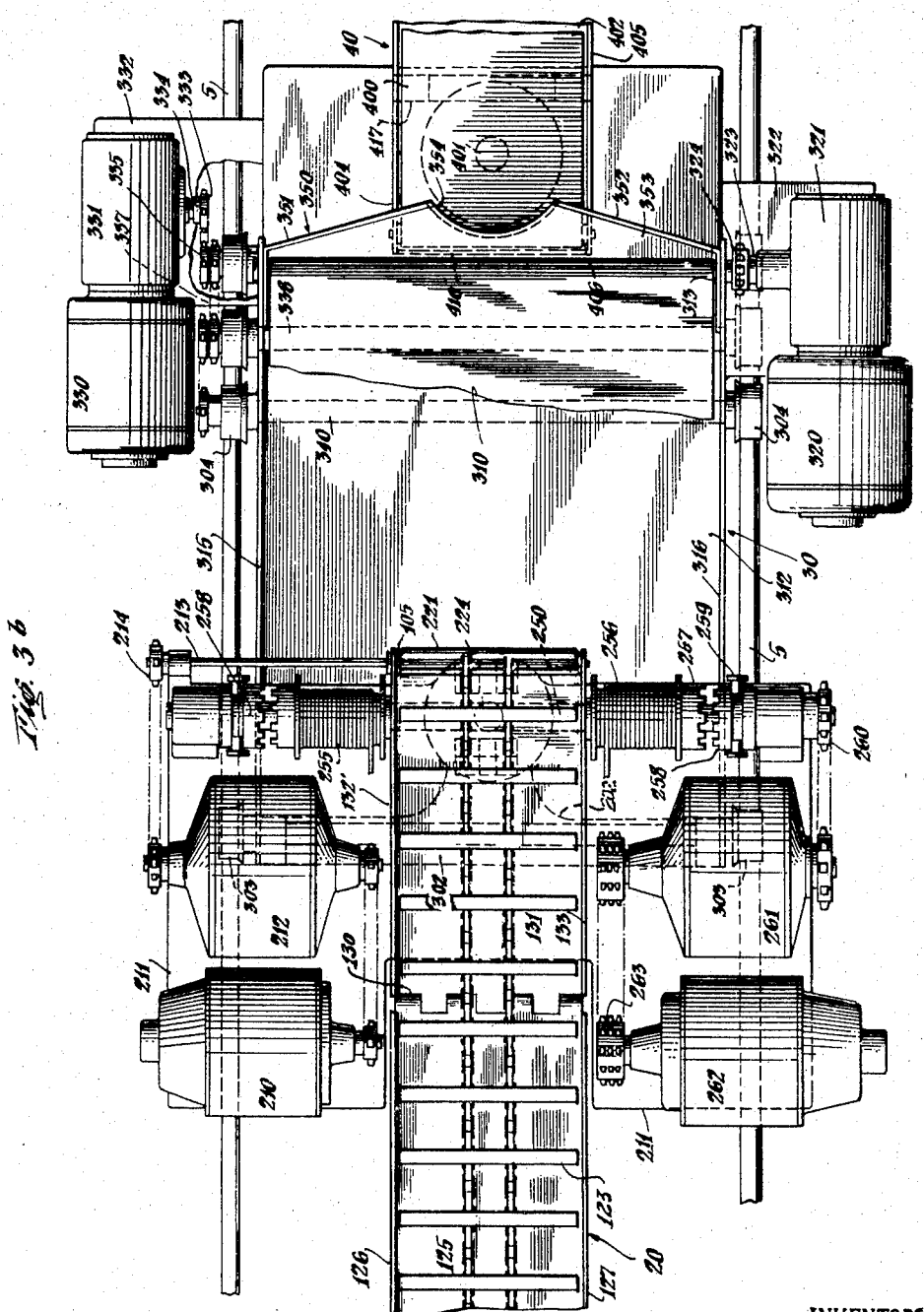

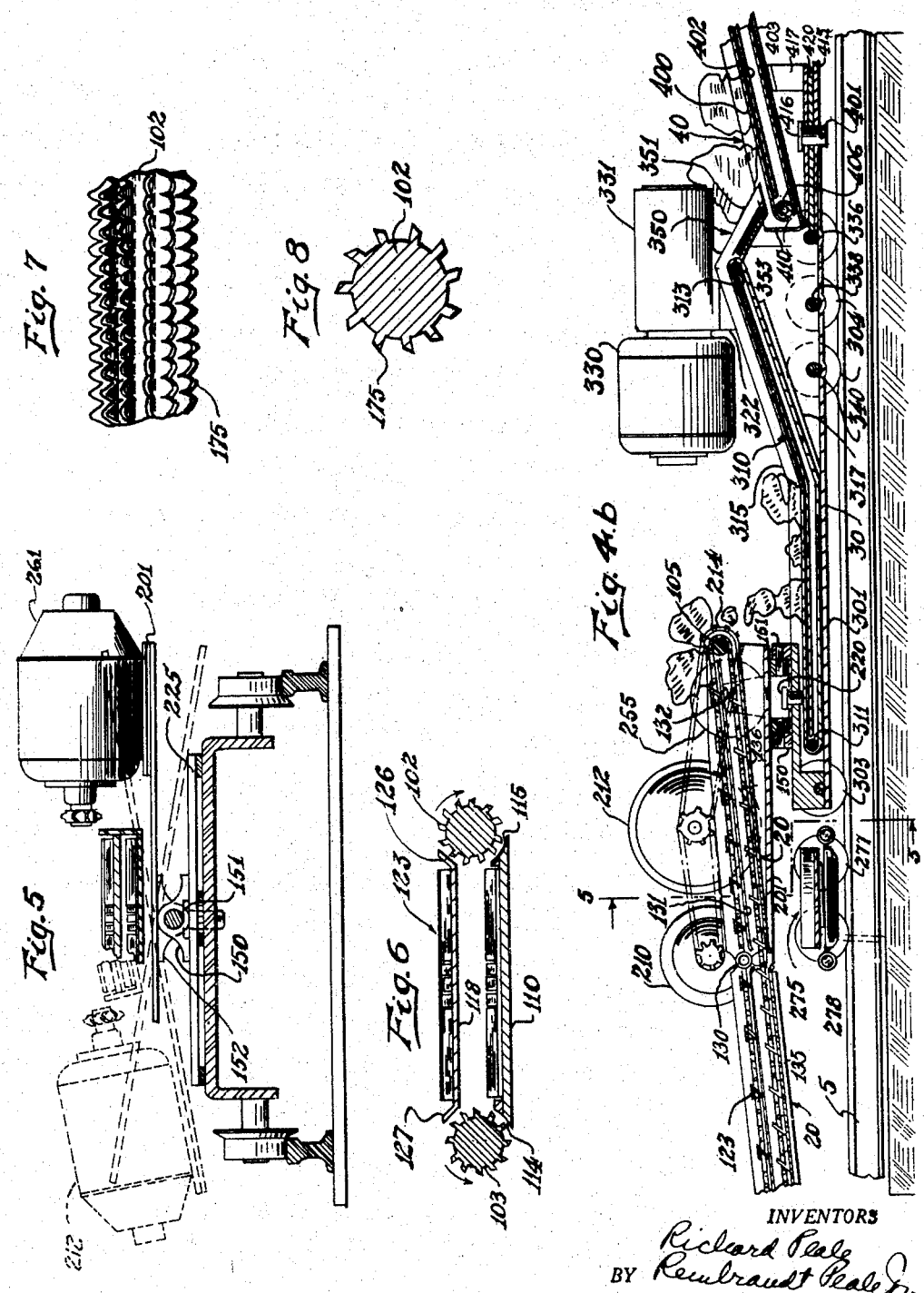

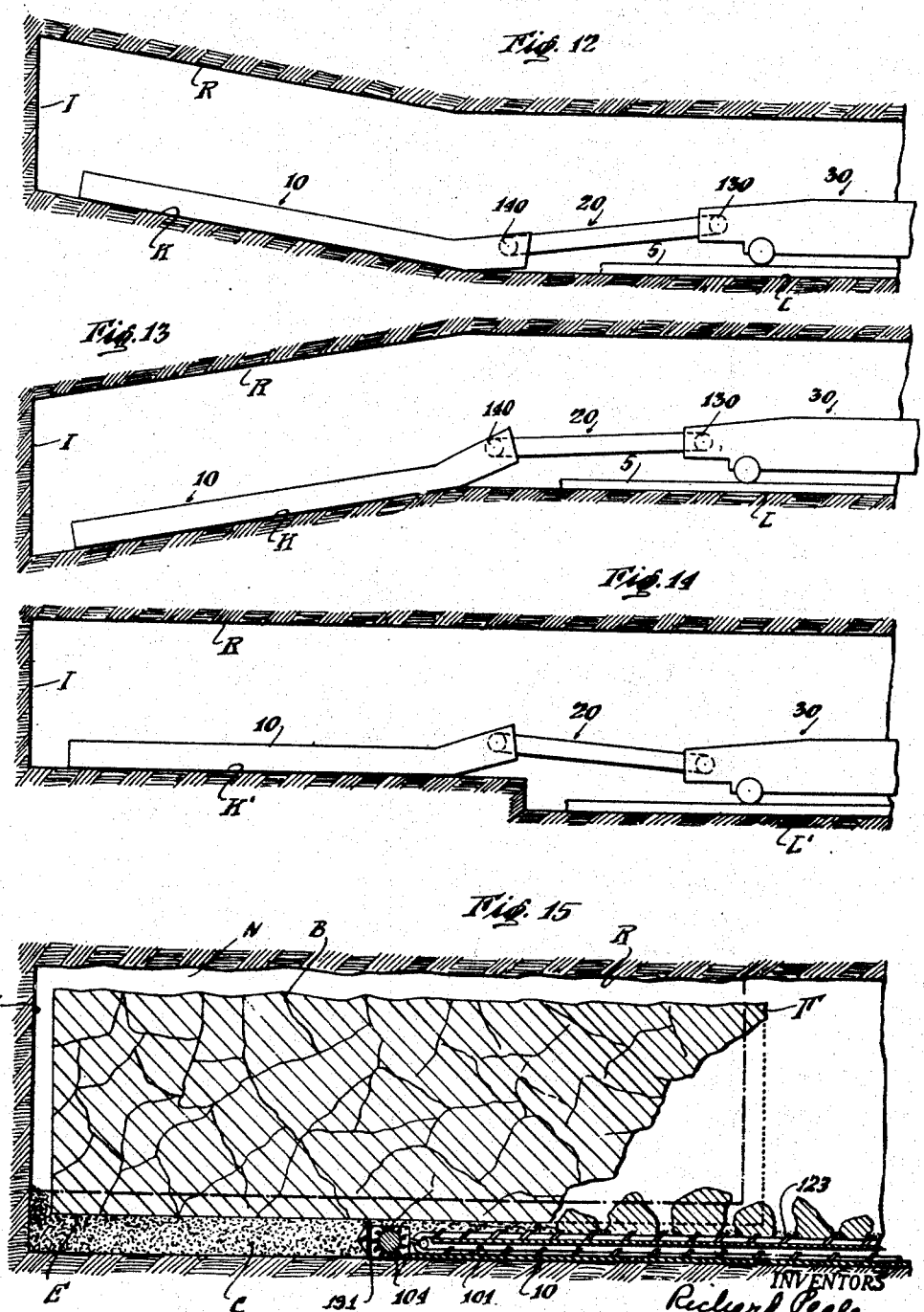

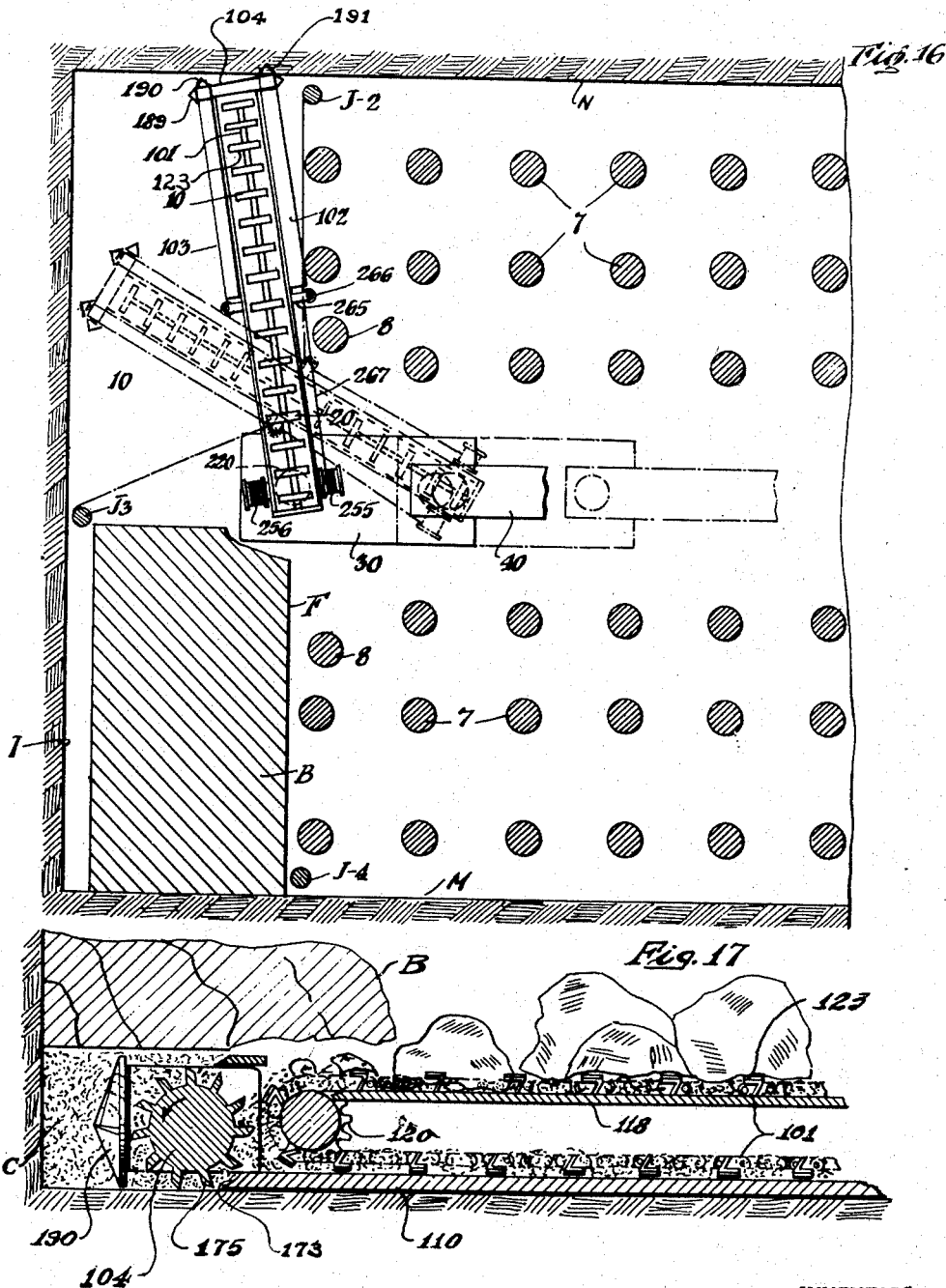

Nov. 4, 1947.  R. PEALE ET AL  2,430,364
APPARATUS FOR MINING AND LOADING COAL
Filed Aug. 30, 1944  10 Sheets-Sheet 8

INVENTORS
Richard Peale
BY Rembrandt Peale Jr.
Hobart N. Durham
ATTORNEY

Nov. 4, 1947.                R. PEALE ET AL                    2,430,364
                     APPARATUS FOR MINING AND LOADING COAL
                     Filed Aug. 30, 1944          10 Sheets-Sheet 10
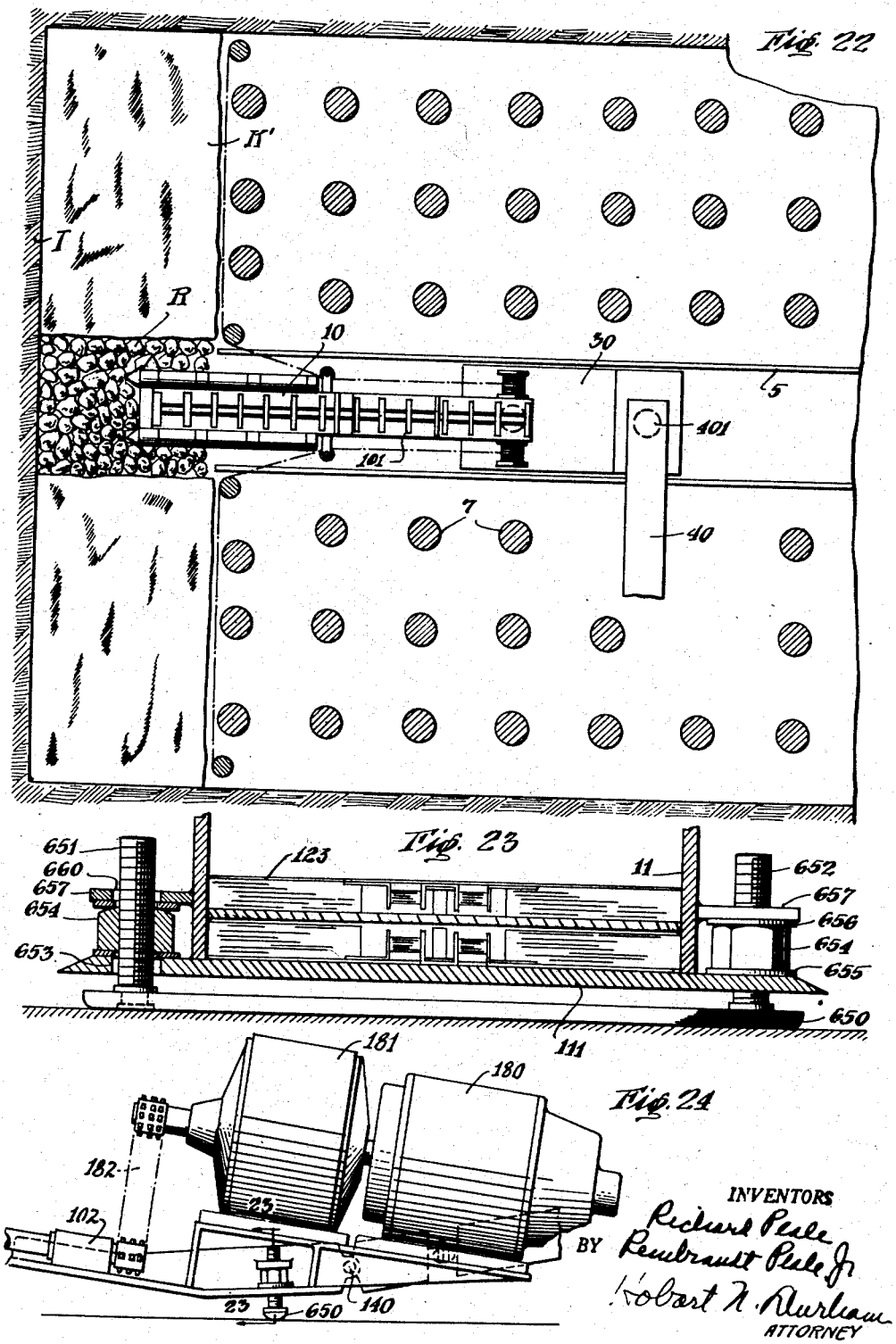

Patented Nov. 4, 1947

2,430,364

UNITED STATES PATENT OFFICE 2,430,364

APPARATUS FOR MINING AND LOADING COAL

Richard Peale, Clearfield, Pa., and Rembrandt Peale, Jr., Greenwich, Conn., assignors to Richard Peale, Clearfield, Pa., and Rembrandt Peale, Jr., Greenwich, Conn., as trustees Application August 30, 1944, Serial No. 551,828

18 Claims. (Cl. 262—9)

This invention relates to coal mining and more particularly to a novel and useful method and apparatus for mining and loading mined coal, especially in mines where the seams are very thin, that is to say, generally seams 30 inches or less in height.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawings, referred to herein and constituting a part hereof, illustrate one embodiment of the invention, and together with the description, serve to explain the principles of the invention.

Of the drawings:

Fig. 1 is the plan view of the interior of a mine room showing somewhat diagrammatically a mobile loader embodying the invention in various typical operating positions for loading out shot-down coal at the face of the room;

Fig. 2 is a side elevation of said mobile loader in greater detail, parts being broken away to show conveyor structure, said loader being shown in travelling position on a track;

Figure 18:
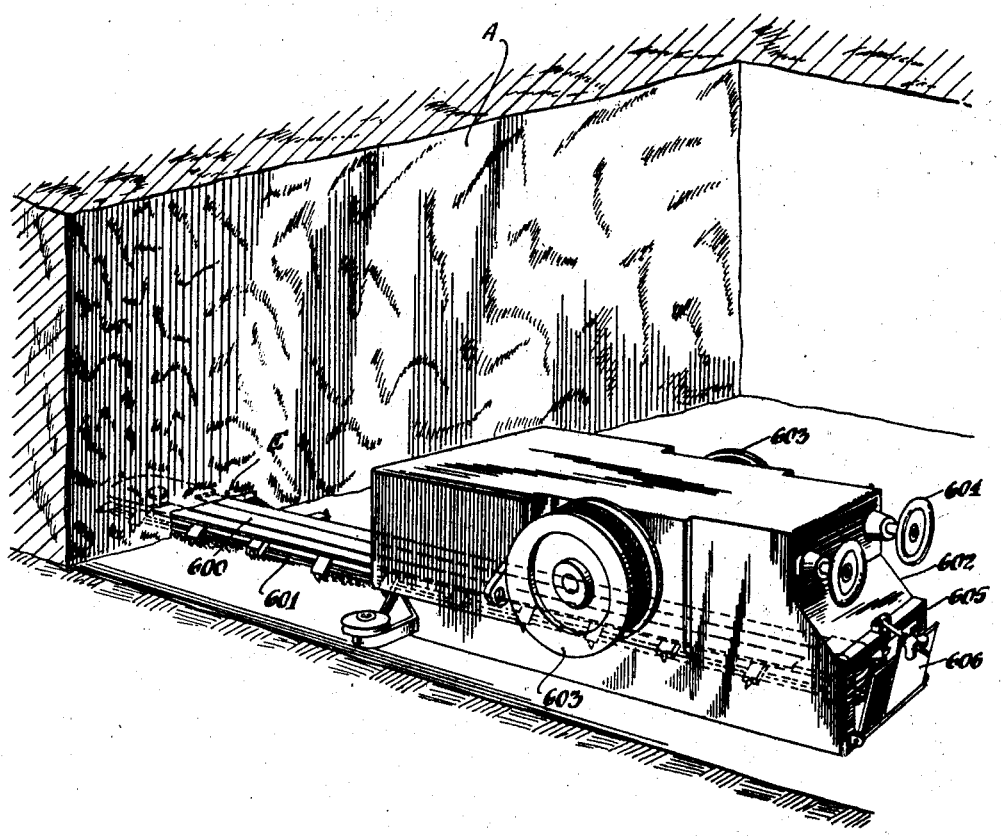
Figure 19:
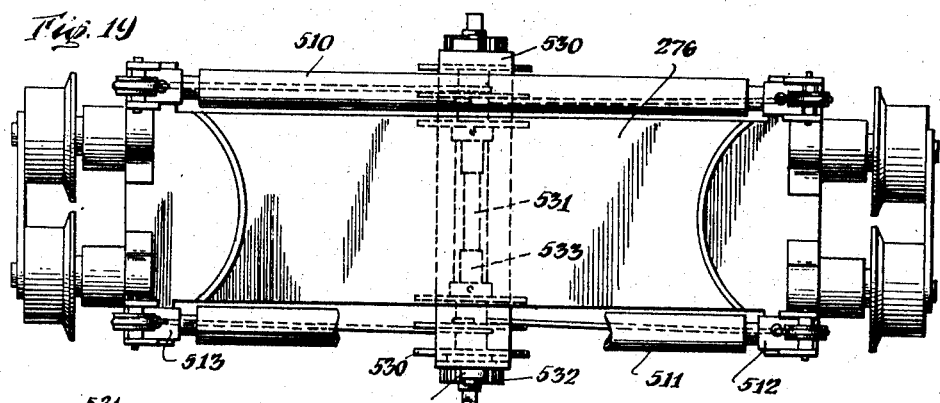
Figure 20:
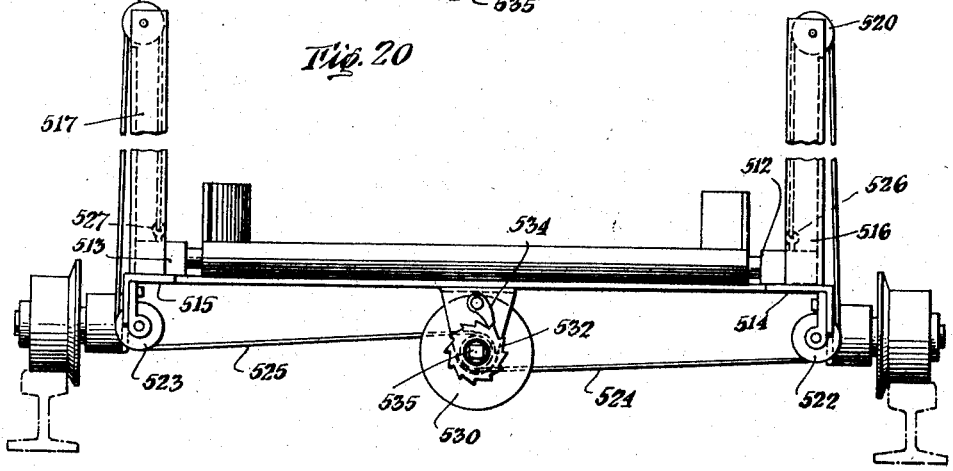
Figure 21:
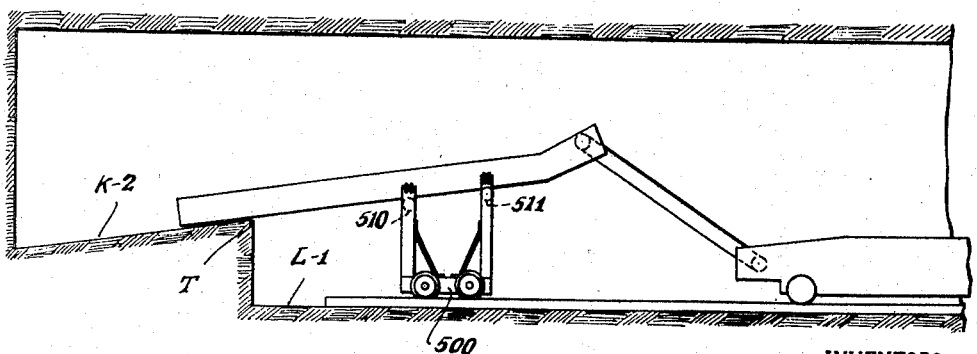

Fig. 3—a is an enlarged plan of the forward portion of said mobile loader;

Fig. 3—b is a similar view of the intermediate and part of the rear portions of said loader, including the mobile carriage;

Fig. 4—a and Fig. 4—b are longitudinal vertical sections of those parts of the loader shown in Fig. 3—a and Fig. 3—b, respectively;

Fig. 5 is an enlarged transverse vertical section on line 5—5 of Fig. 4—b, showing the axial pivot for the loading head;

Fig. 6 is a similar section on line 6—6 of Fig. 3—a;

Fig. 7 is an enlarged fragmentary elevation of one of the feeder rollers of the loading head;

Fig. 8 is a vertical section on line 8—8 of Fig. 7;

Fig. 9 is an enlarged top plan of one form of pony truck used with the invention;

Fig. 10 is a longitudinal vertical section on line 10—10 of Fig. 9;

Fig. 11 is a transverse section on line 11—11 of Fig. 10;

Figs. 12, 13 and 14 are diagrammatical views showing the adaptability of the loading head to various pitches and conformations of the floor of a mine;

Fig. 15 is a fragmentary diagrammatic side elevation of the loader head showing same in a typical loading operation under a mass of shot-down coal;

Fig. 16 is a plan view similar to Fig. 1 showing various operating positions of the loader;

Fig. 17 is an enlarged fragmentary longitudinal vertical section showing construction details of the loading head;

Fig. 18 is a diagrammatic view of a cutting machine designed to operate in accordance with the invention;

Fig. 19 is a plan view of a modified form of pony truck;

Fig. 20 is an end elevation thereof;

Fig. 21 is a diagrammatic showing of the use of said modified pony truck in loading from an inclined bottom.

Fig. 22 is a plan view similar to Fig. 1 showing the use of the loader removing and gobbing bottom rock;

Fig. 23 is a fragmentary cross-section of a head-inclining device taken on line 23—23 of Fig. 24; and Fig. 24 is a side elevation of the related portion of the loader showing said device attached thereto.

This application is a continuation-in-part of our copending application Ser. No. 534,030, filed May 4, 1944, for "Method and apparatus for mining and loading coal," certain parts hereof being divided out of said application and other parts being originally disclosed herein.

The invention is directed to providing improved means for loading shot-down coal at the mine face. In its mechanical aspects the invention constitutes primarily an improved form of so-called mobile loader wherein apparatus capable of being moved by itself from place to place within the mine, preferably on a track or rails, is equipped with devices for gathering coal which has been shattered or "shot-down" at the mine face and for conveying same automatically away from the face to a car or other receptacle some distance away.

The invention is particularly directed to the mining and loading of bituminous coal in low seam mines where the head space is so low that men cannot work comfortably or efficiently and where the enlarging of the head space by removal of bottom or top rock is costly and unproductive when done by hand. Because of these mining conditions an efficient machine must be held to the lowest possible overall height, yet must be able to handle the largest possible amount of material in its loading movements, the thinness of the seam of coal making it necessary for the machine to traverse a large area quickly in its loading operations so as to handle and convey worthwhile quantities of material.

Having in mind these primary objects, the invention provides apparatus for mining and loading large quantities of thin-seam coal quickly and efficiently with a minimum of head room and without lifting the coal more than a very short distance throughout the entire loading operation. By virtue of the novel mining method employed in conjunction with our improved loading apparatus, as disclosed and claimed in said parent application Ser. No. 534,030, the shattering and breaking of the coal, both from shooting down and from loading, is held to the minimum so that even the most friable coal is taken out in the larger and more valuable sizes. Moreover the coal is handled in such a way that practically no dirt or impurities from either the top or bottom become intermixed with it during the mining and loading operations. Thus a coarser and cleaner coal product is obtained.

As another important object, the invention makes possible the mobile loading of shot-down coal at the mine face with an apparatus which occupies a minimum of space in the timbered part of the room, especially in the danger area near the face. Consequently it is possible to set the props very close to the mine face, thereby greatly reducing the danger to miners and permitting strict compliance with the most recent laws and regulations requiring close timbering at the face. Nevertheless, because of its mobility and maneuverability, the machine of the invention can operate in virtually any position or location within a mine and is usable in all types of coal removal operations.

The invention also provides a novel construction which enables the coal-engaging portion or head of the loader to follow and conform very closely to the shape of the mine bottom so that in all cases the loader head will follow and "hug" the bottom regardless of irregularities, variations in slope and direction therein so that the loader will always take out all the coal cleanly and completely. This feature is of great importance in thin seam mining to insure that the output of the machine be kept at the peak and also to insure that full advantage is taken of the relatively small head room existing in such mines.

Briefly described, the invention provides a mobile, track-mounted loader having a flat elongated loading head adapted to be projected into the undercut kerf of a shot-down face of coal without requiring any settings of jacks or other such usual paraphernalia in front or "inby" of the loading head. The loading head comprises a flat endless conveyor, preferably of the chain-drag type, occupying most of the length and breadth of the head so as to be projected entirely through the under-cut beneath the shot-down mass to the solid face of the coal. Said conveyor is arranged so that the upper portion travels rearwardly and carries with it whatever coal may be deposited upon it, while the lower portion is designed to draw material forwardly along the bottom of the head and deliver it to the upper, rearwardly travelling portion. Along either side and also preferably across the front end of the loading head are provided power-driven rotary means for digging into and gathering material in their orbits of movement and conveying same toward the centrally-disposed conveyor for deposit in the path of the lower portion thereof. Said rotary feeders and lower portion of the conveyor are thus adapted to clear a path for the advance of the loading head under and through the coal and cuttings lying in the kerf. Upon the removal of such relatively loose, fine material in the kerf the overhanging shattered masses of coal progressively fall upon the upper reach of the conveyor and are carried by it to the rear.

By a plurality of internal pivot joints and connections the loader head is so articulated with respect to the rearward portions of the machine and conveyor that it is adapted to lie upon and conform closely to the bottom surface of the mine regardless of whatever irregularities and differences in slope or direction may exist between the plane in which the supporting tracks are laid and those of the bottom underlying the shot-down coal. This feature of the invention is of great importance because it enables the loading head always to underlie and remain substantially parallel to the bottom strata of the shot-down coal so that a complete loading of said mass can be effected at all times while the loading head remains at the bottom and thus takes advantage of the entire head room available.

The conveyor within the loading head continues rearwardly beyond the end of said head proper and is inclined upwardly just high enough to overlie a wider intermediate belt conveyor with respect to which it has horizontal pivotal movement. The intermediate conveyor at its rear end overlies in turn a third rearwardly disposed belt conveyor which carries the coal backwardly at any desired horizontal angle for deposit in the ultimate receptacle. This entire assembly is movable on a carriage along the trackway which is stationed preferably in the center of the mine room so that the loader can be readily brought into operating position and as readily withdrawn and conveyed to another part of the mine during intermediate operations in that room.

Novel method steps, claimed in said co-pending, parent application, are employed in preparing the coal for loading by the above-described apparatus. In accordance therewith the coal is undercut by a kerf cutter in the conventional manner, usually to a depth of about six feet. During the kerf-cutting operation, however, the machine cuttings (comprising the relatively fine coal particles broken up by the machine bits of the cutter bar) are retained or restored to the space within the kerf to build up a relatively thick bed of cuttings therewithin. This step is contrary to the conventional practice of clearing out and removing most of those cuttings from the kerf. As a result, a substantial bed of cuttings is left underlying the overhanging mass of coal after the kerf has been cut. The coal then being drilled and shot down in the usual way, the mass of coal breaks away from the face and settles onto the bed of machine cuttings so that it is supported by said cuttings several inches above the mine floor. This operation has the incidental advantage of reducing the breakage or degradation of the coal into small lumps, the shot-down mass being parted from the roof and settling in a relatively integral mass on the cuttings bed. The presence of said bed is even more important, however, in facilitating the entry and operation of the loading head within the kerf. The bed of cuttings provides a relatively easy and uniform medium for the advancing and conveying action of the feeder rolls on the loader head so that said head can be moved into and through the kerf space occupied by the bed of cuttings without great difficulty and without disintegrating any of the larger lumps of coal above. When the loading head has been advanced beneath the shot-down mass a sufficient distance and the bed of cuttings in that area has been gathered and loaded out by the feeders and conveyors, then the overhanging mass of shattered coal will fall, usually of its own weight, onto the loader belt and be carried away in prime condition.

By advancing the articulated loading head forwardly and angularly, the entire mass of shot-down coal can thus be loaded out with the minimum expenditure of time and power. It will be noted that virtually none of the coal is lifted or forced upwardly during the loading operation in order to get it upon the loader conveyor, but falls thereupon as it is undermined. Thus a minimum of vertical space is required for the most efficient operation of the loading apparatus and this feature in itself greatly contributes to the quality of the coal loaded out.

Many features of the invention are also applicable when the kerf is cut at the top of the seam. In this operation, of course, the supporting bed of cuttings cannot be provided and consequently the progress of the loading head into the bottom of the shot-down mass cannot be so rapid and uniform. Nevertheless the loading head is capable of digging its way, as previously described, through the bottom strata of the shot-down mass and gathering and carrying away the coal therein while the overhead portions of that mass fall onto the upper reach of the conveyor. In this form of mining the lack of the cuttings bed is somewhat compensated for by the fact that the drill holes for the explosives are made near the bottom of the seam, so that the shattering effect of the explosive is greatest along the seam bottom. As a result the finer fragments of the shattered mass will be more concentrated in the lower strata and thus, to such extent, will facilitate the entry and operation of the loading head. In this operation as well it will be understood that the loading head, throughout its length, follows the contour of the seam bottom regardless of the pitch and/or transverse inclination thereof, and all of the beneficial features of said loading head construction are applicable as will be understood and hereinafter more particularly described.

It will be understood that the foregoing general description of the invention and the following detailed description as well are illustrative and explanatory of the invention but are not restrictive thereof.

Referring now in detail to the present preferred embodiment of the invention illustrated by way of example in the accompanying drawings, a somewhat diagrammatic overall view of the mobile loader in operating position is shown in Fig. 1. This view represents a typical mine room or entry being advanced inwardly toward the solid face I between solid side walls M and N. The shaded area B represents a mass of coal which has been undercut by the method hereinbefore described and then shot down to lie upon a bed of machine cuttings C therebeneath (Fig. 15). A trackway 5 of two parallel mine rails is laid longitudinally centrally of the room as shown, the tracks terminating just short of the outer face F of the shot-down mass. Rows of roof-supporting timbers or props 7 are provided throughout the cleared portion of the room, the space between said props usually being approximately 3 ft. from center to center. In the arrangement shown, it will be noted that the inner row of props is spaced quite close to the face F, in practice being placed as close as one foot therefrom. This spacing of the props is in accordance with recent safety recommendations of state and federal mining departments. The spacing of said props 7 is uniform throughout the room except for the area necessary to accommodate the trackway 5 (approximately 4 ft.); also the props 8 nearest the track in the row adjacent the face F are offset from the track approximately one foot, as shown, for purposes hereinafter described. The width of the room between the walls M and N is, as shown, the customary distance of approximately 24 ft. and the length of depth of the kerf between face I and face F, which determines the lengthwise dimension of the mass of coal B, is approximately 6 ft. in the illustrative example shown. It will be understood, however, that these dimensions are not critical and that the principles of the invention are adaptable to different situations and mining operations.

Referring to the general layout of the loading machine (Figs. 1 and 2) same comprises the forward or inby portion 10 known as the loading head, which is made up primarily of a rigid frame of two superposed, spaced-apart flat plates supporting the centrally and longitudinally disposed chain-drag conveyor 101, the rotary side feeder bars 102 and 103 and the rotary end feeder bar 104 (Fig. 3—a). The rear end of said loading head may be considered as terminating at the rear end of the feeder bars 102 and 103. However, the conveyor 101 continues rearwardly therebeyond to the rear sprocket roller 105 and between those points the conveyor is inclined upwardly to form the driving and elevating portion 20 of the loading mechanism. The next unit of the apparatus comprises generally the intermediate, wide belt conveyor 30, the inner end of which underlies the rear end of the loader conveyor 101 and the rear end of which inclines upwardly and rearwardly to feed onto the forward end of the conveyor 40, comprising the final unit of the apparatus considered as a whole.

Referring now to the detailed construction of the loading head unit 10 and its associated driving and coal elevating unit 20, the loading head proper is supported upon a rigid frame comprising bottom plate 110 which underlies the front end and extends rearwardly beyond the rear end of the feed shafts 102 and 103 to be inclined upwardly at 111 and terminate at an elevated point (Fig. 4—a). The side edges 114 and 115 of the bottom plate 110 are downwardly and outwardly arcuately bevelled (Fig. 6) throughout the length of the flat or horizontal portion of said plate. Some distance in from either side edge of said plate are fixed upstanding spaced-apart side frame bars 116 and 117. Bridged between said side bars and spaced above the upper surface of the bottom plate is an upper, thinner conveyor spacing and supporting plate 118 which lies substantially parallel to the bottom plate 110 throughout the length thereof.

Vertical side frame plates 116 and 117 are welded to bottom plate 110—111, extending forwardly from the rear end thereof to the point 113. Similar shorter side plates 121 are erected near the front end of the bottom plate 110. The upper plate 118 is further supported by cross beams 119 and 122 adjacent the front and rear ends thereof respectively. Thus the interplate space 124 between the upper and lower plates is left open throughout the major length of the loading head.

The conveyor 101 comprises two parallel endless sprocket chains designed to travel along the center part of the plates 110 and 118 so that the upper reach of the chain moves rearwardly and the lower reach forwardly. A sprocket roller 105 provides the chain drive at the rear end of unit 20 (Fig. 3–b) and an idle rotatable roller 120, journaled in the front side plates 121, supports said chains at the front end. Said conveyor chains have rigid drag bars or flights 123, preferably Z-shaped in cross-section, which are connected at suitable intervals uniformly throughout the length of the chains. As shown, said bars lie in contact with the flat upper surfaces of plates 110 and 118 respectively so as to draw any material along said surfaces in known manner.

Means are provided for driving the chains of conveyor 101 so that the upper reach thereof travels rearwardly to transport coal away from the loading head. For this purpose a motor 210 is mounted on a platform 211 at one side of the conveyor (Fig. 3—b). Through reducer gearing 212, said motor drives a cross shaft 213 by means of chain and sprocket connection 214. Said shaft 213 is co-axial with the rear sprocket shaft 105 and thus drives the conveyor chains 101, the opposite or forward end of which run over the idle sprocket roller 120.

In unit 20, beyond the rear end 112 of bottom plate 110 the conveyor chains continue upwardly and rearwardly at substantially the same slope, the upper run being supported by a spacer plate 125 which is essentially a continuation of the plate 118, being bridged between two vertical side frame members 126 and 127, which members are in effect prolongations of the frame side members 116 and 117. The spacer plate 125 terminates at a horizontal pivot line 130 (Fig. 4—b) and beyond that line a similar spacer plate 131 extends rearwardly and upwardly to terminate at 132 short of the rear sprocket roller 105. This third spacer plate 131 is similarly supported by upstanding side members 132' and 133. In like manner the bottom plate 110 has its counterpart, similarly arranged bottom plates 135 and 136 in unit 20.

As will be seen from the drawings, means are provided for affording several loci of internal articulation for the conveyor belt 101 so that it and the loader head can turn in a plurality of directions and in several planes in order to effect the greatest possible conformity of the loader head with the surface of the mine floor while enabling the coal conveying apparatus to be kept as low in height as possible. For this purpose a plurality of horizontal transverse hinges or swivels are provided throughout the length of the conveyor 110. The first of these hinges is adjacent the rear end of the loading head 10, that is near the rear end 112 of the plate 110 (Fig. 4—a). At this locus a horizontal transverse pivot rod or pin 140 is formed at the end of spacer plate 118. Said rod is rotatably supported in curved bearing hooks formed by projecting tongues 141 at the end of said bearing plate. The side walls 116 and 117 also terminate at this locus and the ends thereof are bevelled upwardly and downwardly toward the pin 140 so as to provide freedom of pivotal movement for the loading head thereabout.

Angular movement about a second transverse horizontal axis is also provided at the junction between the rear end of spacer plate 125 and the forward end of spacer plate 131 (Fig. 3—b). At this locus a transverse horizontal pivot pin 130 is coupled to said two plates by means of intermeshed hooked tongues formed therein in the manner previously described (Fig. 4—b). Similarly the ends of the respective side plates 126, 127 and 132', 133 are bevelled to provide the desired freedom of angular movement.

Thus the endless conveyor chains and flights may be considered to be supported on and about a single frame from one end of the conveyor to the other. This interconnected conveyor-supporting framework is, as shown and described, divided generally into three articulated sections or portions, the forward portion comprising the loader head which pivots around the horizontal or transverse axis 140; the intermediate portion which pivots about the transverse axis 130 and the rear portion which is fixed in its longitudinal inclination with respect to the supporting carriage of unit 30, as described below. That frame thus comprises for the forward or head portion 10, the bottom plate 110—111 and the top plate 118 and the two side plates 116 and 117; for the intermediate portion, the bottom plate 135 and top plate 125 with the side plates 126 and 127 thereon; and for the rear portion, the bottom plate 136, the top plate 131 and the continuation side plates 132' and 133.

Means for maintaining the rear end of the unit 20 elevated above the telescoped end of the unit 30 (Fig. 4—b) comprises a carriage formed with a flat bottom plate 301, the forward end of which is connected to an axle 302 which supports track wheels 303 at its ends. Near the opposite or rear end of plate 301 are provided a plurality of track wheels 304, at either side of the track, which wheels are connected to axles 336, 338 and 340, seated in and fixed to the upper surface of plate 301. A horizontal plate 201 overlies the front end of plate 301 and is supported therefrom and spaced thereabove by a cross block 202. Said plate 201 provides the supporting base for the rear end of conveyor supporting plate 136, the bottom edges of the side plates 132' and 133 to which said spacer plate 131 is attached being welded to the upper face of said supporting plate 201.

Means are provided for permitting a horizontal angular swinging movement of the entire conveyor 101, including said frame and all parts associated therewith from the loading head back to and including the rear sprocket 105. This swinging movement is designed to take place about a vertical axis 220 at the rear end of unit 20 (Fig. 4—b). For this purpose the rear end of the plate 201 is reduced and rounded at 221 and is apertured for the passage of the vertical pivot pin 220 therethrough. The pin passes downwardly through said aperture in plate 201 and is fixed in a horizontal supporting plate 223 which projects rearwardly from the block 202. The upper end of the pivot pin 220 is provided with an enlarged head 224 which overlies a suitable turntable spacing plate 225. Thus it will be seen that the entire frame structure comprising the units 10 and 20 may rotate horizontally about the axis 220 and in the present preferred embodiment of the invention this freedom of rotation is preferably at least 180° (Figs. 1, 16).

The invention also provides angular freedom of movement for the loading head, the three-part conveyor frame and all connected parts of the units 10 and 20 to rock about a horizontal longitudinal axis, which is preferably mechanically and functionally substantially coincident with the central longitudinal axis of the conveyor and its frame. This pivot axis is preferably embodied in the turntable construction adjacent the turntable vertical axis 220, although, as shown in our copending application Ser. No. 534,030, it may be placed farther forward, especially if a flexible belt conveyor be used in the units 10 and 20 as there shown. As here preferably embodied (Figs. 4—b and 5) the upper surface of turntable 225 is provided with two diametrically opposite journal bearings 150 in which short shafts 151 are rotatably mounted. About said shafts and fixed to turn therewith are brackets 152 which are fixed to and support the overhead plate 201 of conveyor unit 20. The shafts 151 are disposed centrally and in alinement with respect to the central longitudinal axes of the units 10 and 20. Accordingly all structures supported by said units are capable of rocking transversely as shown in Fig. 5 for example.

Thus it will be clear that the loading head 10 is provided with angular freedom of movement in all directions, whereby it may be turned horizontally about axis 220, tilted transversely about shafts 151, and inclined freely in the direction of its length by means of the two transverse hinge joints 130 and 140. As will more fully appear hereinafter, these four pivotal linkages enable the head to conform most closely to the mine bottom and to be moved into all desired loci in the mine room while the units 30 and 40 remain centrally located on the trackway 5.

In travelling along the track 5 to approach or leave loading position, as shown in Fig. 2, the forward loading head 10 and elevating portion 20 are preferably supported above the track to roll therealong by a free running pony truck 275 (Fig. 2). Said truck (Figs. 9, 10, 11) is provided with a flat plate 276 from either end of which extend axles for the pair of wheels 277 and 278 on the left and 279 and 280 on the right, said axles being journalled in suitable bearing bushings 281 fixed to the ends of the plate 276 by means of integral end flanges 282. Along the front and rear edges of the plate 276 are provided rollers 283 and 284 which extend above the level thereof and serve as rolling supports for the plate 110 as it slides over the top of the truck as hereinbefore described. The ends of said rollers are suitably journalled in depending journal brackets 285 as shown. To facilitate turning movement of the loading head frame in its horizontal angular movements, arcuate guide flanges 286 and 287 may be provided at either end of the plate 276 and upstanding therefrom.

In accordance with the invention the width of the conveyor of unit 30 is substantially greater than that of conveyor 101 of units 10 and 20, which it partially underlies (Figs. 3—b and 4—b). By virtue of this construction, rotation of the loading head and its conveyor 101 about the axis 220 can take place through a relatively wide angle, as aforesaid, and the material delivered thereby will nevertheless always fall onto some part of the surface of said wide conveyor of unit 30. This feature of the invention also obviates the use of high side funneling members or guards along the conveyor of unit 30, thereby tending to maintain the overall structure at the lowest possible height.

The conveyor for unit 30 comprises the wide flexible conveyor belt 310 of rubber or other suitable material. The forward end of the belt passes about an idle roller 311, the upper reach of the belt being supported upon a spacing plate 312, while the rear end of the belt travels around the driven roller 313. The axles of both rollers and the spacing plate are all supported from vertical side wall members 315 and 316 which extend throughout the length of the conveyor and are welded at their lower edges to the upper surface of the bottom plate 301. As will be apparent from Fig. 4—b substantially the forward half of the conveyor 310 is horizontal but the rear half thereof inclines upwardly and rearwardly to reach a top height about level with that of the rear end of the forward conveyor 101. For this purpose the top edges of side plates 315 and 316 are similarly inclined upwardly and rearwardly and the bottom reach of the conveyor is supported on an upwardly inclined plate 317 which is supported along its edges by said side plates. The embodied means for imparting drive to the rear belt-supporting and driving roller 313, comprises a motor 320 and reducing gear 321 which are supported as a unit by bracket 322 extending from the side wall 316. Shaft 323 from the reducer drives roller 313 by chain and sprocket connection 324 (Fig. 3—b).

The embodied means for driving the car wheels 304 so as to move the loader along the track are shown in Figs. 3—b and 4—b. Preferably this drive is provided by a motor 330 with reduction gearing 331, both of which are mounted on a suitable bracket 332 extending from the side wall 315 of the unit 30. A sprocket chain 333 couples the end of the driving shaft 334 to a sprocket 335 on the projected end of the axle 336 of the rear set of wheels 304. Similarly chain and sprocket connection 337 transmits drive from axle 336 to axle 338 and a third chain and sprocket connection 339 transmits the drive to the forward axle 340. Suitable clutch means (not shown) may be provided for connecting and disconnecting the drive from the motor reduction to the wheel axles or the control may be provided by the motor switch in known manner as desired.

The rear discharge unit of the loader apparatus, as previously described comprises the conveyor unit 40 onto which the rear end of the intermediate conveyor unit 30 is designed to feed. As shown in Figs. 3—b and 4—b the conveyor unit 40 has a relatively narrow belt 400 similar in width and general construction to that of the conveyor 101 of the forward units. It is designed to receive the coal carried from the rear end of conveyor 310, which for such purpose is provided with a chute 350 which is inclined rearwardly and downwardly to overhang the rear end of the conveyor 400. Said chute conveniently comprises an extension of the side walls 315 and 316, but is sharply narrowed by the rearwardly and inwardly inclined guard walls 351 and 352, the inner ends of which overhang the forward end of conveyor 400 and are spaced apart a distance somewhat less than the width thereof. A bottom plate 353 completes said chute, the terminal edge 354 thereof being arcuate as shown in Fig. 3—b.

In accordance with the invention the rear conveyor unit 40 is upwardly and rearwardly inclined to deliver the coal into any suitable receptacle such as a mine car on the tracks 5. Said conveyor unit 40 is also designed to be rotatable horizontally about its forward end so as to deliver the coal at any point within a substantial arcuate sweep of its rear end. The mounting of the forward end thereof, is for this purpose, made rotatable about a vertical axis through the pin 401 which extends upwardly through a central aperture near the rear projecting end portion of the plate 301. The conveyor belt 400 itself is supported in its upper reach on an upwardly and rearwardly inclined flat spacing plate 402 and in its lower reach on a similar parallelly inclined plate 403. Said plates are both connected along their edges to vertical side wall members 404 and 405. The front end of the conveyor belt passes over a horizontal transverse roller 406, the ends of which are journalled in said side walls. An upstanding front wall 410 is attached to the forward edge of the bottom plate 403 and the ends of the side walls 404 and 405, the upper edge of said wall 410 underlying the bottom plate 353 of the chute.

The forward portion of the inclined bottom plate 403 and the front wall 410 are seated upon a turntable plate 415 which is centrally apertured to turn about the upper end of the pivot pin 401, said end being provided with a head 416. A pair of upstanding brackets 417 are seated on the top surface of said turntable plate 415 and underlie and support the bottom plate 403 at the required inclination. A circular turntable washer 420 lies between the plate 301 and plate 415.

Thus it will be seen that the forward end of the rear conveyor unit 40 is rotatable about the vertical axis 401 through any desired horizontal angle, preferably up to 180°. The rear end of said conveyor unit 40, and the drive and supporting means therefor are not shown, same constituting no necessary part of the present invention, but it will be understood that they may be essentially like those shown and described for the intermediate conveyor unit 30. While power means may be provided for turning said unit 40 about the axis 401, it will be understood that same may readily, and usually will, be turned by hand.

Returning to the construction of the loading head (unit 10), a detailed description of the preferred form of the feeder members 102—104 and their driving means will now be given. This construction will be found in Figs. 3—a, 4—a, 6 to 8 and 17. The purpose of these devices is to dig into and gather the coal lying in their path and carry same arcuately around their peripheries toward and onto the upper surface of the plate 110 in the path of the lower reach of the conveyor 101. Hence each of the side feeder members 102 and 103 and the forward feeder member 104 rotate in the directions indicated by the arrows in Figs. 4—a, 6 and 17—that is, so that the outer peripheries of said rotating members will turn downwardly and toward the top surface of the plate 110. Each of said feeder rolls is provided with means on its surface to cut into and disintegrate the material which it encounters while at the same time serving to scrape and carry said material toward and into the conveyor path. In this respect description of the construction and operation of one of said feeder members will suffice for all. Referring for this purpose to the member 102, same comprises a horizontally disposed cylindrical shaft mounted parallel to and spaced between the side edges of lower plate 110 and upper plate 118. The arcuate bevel of edge 115 of plate 110 is concentric with the shaft, while an upwardly and outwardly inclined flange 171 extends from the adjacent edge of plate 118.

A preferred form of means for cutting, distintegrating and translating the coal fragments in the path of said feeder 102 is shown in Figs. 6, 7 and 8. As shown, said means comprise a plurality of rows of radial, tapered teeth 175 with sharpened, reversely beveled ends. Each of said rows of teeth is disposed axially along the surface of the roller 102. In accordance with the invention, the teeth 175 in each row thereof are axially offset or staggered with respect to the two contiguous parallel rows thereof. This is an important feature of the invention because by so staggering or offsetting the successive axial rows of teeth with respect to each other, the flat faces of one row provide a ledge-like surface with respect to the valleys between the teeth in the next adjacent row and so on. Thus fragments of coal picked up by one row of teeth in turning through a mass of broken coal will tend to be held in place on the roll by the overlap of the next adjacent row of teeth and so on. In this manner, the teeth not only penetrate and break up the coal but they also tend to draw and carry same in a regular manner so that said feeder rolls provide effective coal conveying means from the floor of the mine to the receiving surface of the plate 110 and to the space between said plate and the upper one 118.

It will be noted that the ends of the teeth 175 just clear the arcuate edge 114 of the plate 110 and the inclined flanges 126 and 127 of the plate 118. Thus coal fragments carried into the interplate space will be delivered there to the conveyor without substantial elevating from the mine floor, while all such fragments lying within the zone equal to the height of the upper plate (preferably no more than 4½ inches) will be gathered by the rotating rolls and delivered to such interplate space. The inclined guard flanges 126 and 127 serve to clear coal from riding on top of the roller teeth and prevent packing of fragments therebetween. The position of the rollers 102 and 103 just above the beveled plate edges 115 and 114, respectively, causes the coal fragments to be continuously cleared from said edges, thereby promoting the advancing movements of said edges along the mine bottom through the coal.

In operations where relatively hard material is to be loaded, such as bottom rock fragments, as shown in Fig. 22 for example, and also with certain types of relatively hard coal, it may be desirable to employ a somewhat different action with respect to the feed rollers 102, 103 and 104. In this modification, said rollers will be caused to rotate in the opposite directions from those indicated in Fig. 6 and the disposition of the teeth will be the reverse of that shown in Fig. 6. For example, in place of the roller 102 shown in Fig. 6, a roller having the aspect portrayed in Fig. 8 will be substituted and same will turn in counter-clockwise direction as viewed in Fig. 8. With this arrangement the action of the rollers will be to pick up the small fragments of material and to guide and elevate the larger pieces of rock outwardly and upwardly onto the upper surface of the conveyor plate 118. The larger fragments of material will roll over onto said plate 118 while the smaller fragments will feed between the teeth and the space adjacent the flange plates 126 and 127, thereby falling into the path of the lower conveyor reach on plate 110. As stated above, the employment of this modified operation will be found desirable in the handling of rock or other relatively hard material which would normally not be broken up by the roller teeth so that it can pass between same and the arcuate surfaces 114 and 115, as is the case with relatively soft coal.

It will be clear that the construction of the feeder roll 103 is identical with that of the above-described roll 102. Similarly in the usual operation the feeder roll 104 is designed to rotate downwardly and rearwardly toward the conveyor 101—that is, counter-clockwise as viewed in Figs. 4—a and 17. In the modification described in the preceding paragraph, for rock loading, etc., the roll 104 would rotate oppositely, i. e. clockwise as viewed in Fig. 17. Said roll 104 is tapered toward its ends to provide drive clearance and to permit the front end of plate 110 to be bifurcated at 172, as shown, so that the terminal extensions thereof will serve as supports for the gear boxes at the ends of the shafts as later described. The leading, indented edge of said plate 110 is also arcuately beveled as shown at 173.

As will be seen from Fig. 17, in the preferred or usual operation the feed roll 104 and sprocket roller 120 of the conveyor rotate toward each other in opposite senses—that is, like intermeshing gears, although there is a substantial space between the teeth on roller 104 and the elements of the conveyor passing over the roller 120. This interaction of the feeder roll teeth and the conveyor members turning about the sprocket roll provides an elevating action upon the fragments drawn in by the feeder roll 104 and those delivered by the lower reach of the conveyor so that said fragments are rapidly and effectively delivered to the upper reach of the conveyor at the front end.

While in Figs. 6 and 7, the feed roll teeth 175 are shown as sharpened serrations disposed in axial rows along the roll, the invention also contemplates, as a modification, the formation of cutting members formed as continuous axial edges or blades, as shown for example, in Fig. 17 of our copending parent application, Ser. No. 534,030. Thus in Fig. 8 of the present application, the teeth 175 may be understood to represent continuous axial blades as a disclosure of said modification.

The embodied means for driving the above-described assembly of rolls 102—104 is preferably such that power is supplied constantly to both ends of the feeder roll system, that is, at the rear end of shaft 102 and also at the rear end of shaft 103. By this arrangement a distribution of power throughout the system of said three interconnected feeder rolls 102, 103 and 104 is maintained regardless of where the load may happen to be applied. That is, in some operations of the loader head the roll 102 and part of the roll 104 will be biting into the coal mass, while the roll 103 may be turning idle, whereas in other situations the load may be mainly on the roll 103. By providing constant drive at the rear ends of both the rolls 102 and 103, the load torque is absorbed more or less uniformly instead of varying greatly with the distance of the load from the power source, as would be the case if only one side of the system were driven. As will be clear from the drawings, drive is provided for roll 102 by motor 180 and reducer 181 through chain and sprocket connection 182 to the end of shaft 102. Similarly motor 184 and reducer 185 drive shaft 103 through chain and sprocket connection (not shown). The contiguous end of roller 104 is driven from the forward end of shaft 102 by gearing connection 187 while the opposite end of said roll 104 is similarly connected to and driven by the forward end of shaft 103 at 188.

Suitably wound motors of the series type (180 and 184) are provided to compensate for load variations, or, if desired, over-running clutches may be provided so that the less-burdened motor will deliver full power at all times.

Preferably, in accordance with the invention, means are provided at the forward ends of both shafts 102 and 103 to enter into and break up coal masses which lie directly ahead of the forward end of the loading head 10. For this purpose conical disintegrator members 190 and 191 are mounted on reduced, forwardly projecting ends of the shafts 102 and 103 respectively. Said disintegrator members are preferably provided with arcuate tapered flutes or blades 195 which operate to carry out the intended purpose of said devices. Similarly, conical disintegrators 189 are mounted in line with the ends of shaft 104 and are driven by interconnected gearing therefrom. Thus an initial attacking action is provided whether the head be moved forward or swung to one side or the other. The tendency of the blades 195 on cones 189 is to bore into the coal and scoop same rearwardly, while said blades on cones 190 and 191 scoop the coal inwardly—i. e., into the path of roll 104.

In accordance with one important operative feature of the invention, the loading head 10 is moved from place to place within the shot-down coal area B (Fig. 1) by means of traction ropes or cables rather than by the motor-wheel drive of the carriage unit 30. This feature of the invention makes possible the maximum application of power to the advancing and turning movements of the loading head without relying upon the traction of the drive wheels 304 which would tend to slip under any substantial load of the nature required to move the loading head under and through the shot-down mass. Accordingly, means are provided in connection with the forward units 10—20 of the apparatus, to apply drum driven cables to the work of so moving the loading head. For this purpose a motor-driven transverse shaft 250 (Fig. 3—b) passes between the upper and lower reaches of the conveyor belt 101 above the turntable pin 220. Said shaft projects to either side of the belt beyond the outer edges of the conveyor 30 and cable drums 255 and 256 are rotatably mounted on said projecting end portions thereof. Clutch members 257 are formed at the outer faces of said drums for engagement with axially slidable clutch members 258, fixed to rotate with said shaft 250 and movable therealong to engage and disengage with the clutch faces 257. Any suitable means 259, either manually or magnetically operated, may be provided for engaging or disengaging said clutches. Rotation is imparted to the shaft 250 by means of chain and sprocket drive 260, driven from reduction gearing 261 which in turn is drivingly coupled to motor 262 by chain and sprocket drive 263. It will be understood that either clutch may be engaged or disengaged independently of the other to drive or disconnect from the cable drums 255 and 256 respectively.

Suitable operating connections for the drum-driven cables are provided on the loading head. For this purpose transversely projecting bracket 265 (Fig. 1) is provided to extend from the loading head at the rear of feed roll 102 and an eye or sheave 266 is provided at the end thereof for attachment to the end of the cable 267 which is wound upon drum 255. A similar bracket 268 projects from the opposite side of the loading head for attachment to the rope 269 of drum 256.

The operative uses of said cable-attaching brackets will be hereinafter described.

A description of the operation of the invention will now be given. As the first step in preparing the coal for the loading out operations to be performed by the hereinabove-described mobile loader, we undercut the solid face of the coal across the room (conventionally a distance of about 24 ft.), using any suitable form of kerf-cutting machine, for example, that conventionally shown in Fig. 18. Said machine comprises a cutter bar 600 having a cutter chain 601 with cutting teeth designed to travel along and around the bar in the usual manner. The rear housing 602 of the machine contains the conventional drive mechanism, rope drums 603 and controls 604, which may be of any standard arrangement. Ordinarily in such a machine the cuttings from the cutting chain are carried rearwardly thereby along the bottom of the main housing 602 to be discharged through an opening at the rear 605 of said housing, said rear end normally being left open for that purpose. In accordance with the present invention, said rear end 605 is either permanently closed or provided with an adjustable closure such as the hinged gate 606 which, as shown, may be tilted upwardly or downwardly to close more or less of the rear end opening, said closure thereby controlling the amount of cuttings, if any, permitted to escape through said rear opening. When the gate is fully closed, as it will be in the operation of the invention hereinafter described, the cuttings dragged into the base of the machine by the chain will be returned into the kerf from which they came without escaping out of the rear of the machine. A similar arrangement, now shown, may be provided for the same purpose in machines of the type where the cuttings are allowed to escape from the side rather than the rear of the machine. If it is found that not all the cuttings are required to be kept in the kerf, a controlled amount thereof may be allowed to escape through the variable opening of gate 606.

Assuming a typical thin seam of coal A (Figs. 15 and 18) having a thickness of approximately 28 inches, a kerf E approximately six inches in height and approximately 6 feet in depth is cut along the bottom thereof, leaving thereabove an overhang of solid coal B approximately 22 inches high.

In accordance with the invention, steps are taken to build up a substantial bed of machine cuttings in the kerf E, i. e. the relatively fine fragments of coal formed by the cutting action of the teeth on the cutter bar of the kerfing machine. In prior practice, it has been customary for the machine man's helper (called a "scraper)" to shovel that portion of the machine cuttings carried out from under the kerf by the cutting chain away from the rear or side of the machine to prevent said cuttings from being carried back into the kerf by the return movement of the cutting chain. It has also been customary for the scraper to have a long-handled shovel for removing from within the kerf the remaining machine cuttings not carried out by the conveying action of the cutting chain. This practice has prevailed because heretofore it has been desired to provide the maximum fall for the coal when it is shot down so as to break it up to the greatest extent and thus make it less difficult to load out by hand. In accordance with the present invention, however, it is desired to retain and/or return within the kerf virtually all of the machine cuttings. Consequently the practice of removing the cuttings from the rear or side of the machine when same are carried out by the cutting chain, is eliminated, said cuttings being returned into the kerf as aforesaid. Likewise the former practice of the scraper in shovelling the machine cuttings from under the cut is not followed.

By these operations a bed C of the relatively fine machine cuttings is built up and maintained in the kerf E, said bed being approximately 4 inches thick in the present illustrative example (Fig. 15).

As the next step the undercut mass of coal B is drilled and shot down by explosive in the usual way, thus parting it from the roof R by a cleavage space N. The shot-down mass B will then rest upon and compress the bed of cuttings C, so that said bed is reduced to approximately a thickness of 3½ inches. The bed of cuttings C so cushions the fall of the mass B that it remains semi-solid. That is, although fractured throughout by the shooting and falling action, mass B does not thereupon disintegrate or fall apart into fragments or lumps, but remains for the most part in position as a semi-solid mass which is subject to ready separation into relatively large lumps when the support of the bed C is removed. The bed of cuttings C itself, although compressed by the weight of the shot-down mass B, is nevertheless made up of such relatively fine and friable fragments that it may be readily penetrated and dug out, as by a hand pick, for example. Depending upon the hardness and friability of the coal forming the semi-solid shot-down mass B, more or less of the supporting bed of cuttings may be removed, but when an overhang thereof has been produced, depending in extent upon the nature of said coal mass B, the undercut portion thereof will fall of its own weight and break up into lumps over the space from which the supporting bed C has been removed (Fig. 15). In some very hard coals it may be necessary to strike the overhanging mass with a pick in order to loosen or start its fall but ordinarily it will fall of its own weight when a sufficient clearance of the supporting bed C therebeneath has been made.

After the coal mass B has been shot down and is resting upon the bed of cuttings as previously described, the invention next brings into operation the mobile loader hereinbefore described in detail. First, of course, the cutting machine 600 is removed from the room or place and the place is fully timbered as shown in Fig. 1. The loader is then brought up to the shotdown face F (Fig. 1), being propelled thereto by the carriage wheels 304. When in that position the loading head 10 is slightly raised above the pony truck 275 by taking up on the ropes 267 and 269, attached to the brackets 266 and 268, with the drums 255 and 256. The pony truck can then be rolled back by hand into the position shown in Fig. 4—b thereby permitting the loading head to be lowered into the space between the rails and to lie flat thereupon ready to be advanced into the kerf beneath the shot-down mass of coal. As an alternative method of lowering the loading head onto the track, the pony truck may be blocked on the tracks in the position shown in Fig. 4—b and then the entire machine moved forward, the loading head sliding over the rollers on top of the pony truck thus gradually lowering the loading head onto the tracks until the wheels 303 reach positions shown in Fig. 4—b.

As a next step of the loading operation, it is then feasible to move the loading head directly forwardly into the kerf E and bed of machine cuttings C and then gradually to advance same as the machine cuttings C and the shot down mass of coal B are progressively being loaded and conveyed away as shown by Fig. 15, the loading head being so moved until it reaches the solid wall I. For this operation the rope 269 is extended through the sheave on bracket 268 and is run forward to be fixed to a roof jack J adjacent the forward end of the loading head and near to the shot-down face F (Fig. 1). The opposite rope 267 is extended through the sheave on bracket 265, forwardly around sheave on roof jack J—1 and thence across face F to be fixed to the right-hand roof jack J—2 adjacent wall N. Then by taking up the ropes on both drums, the loading head 10 will be projected forwardly in a path parallel to the tracks 5 and beyond the ends thereof (Fig. 15) and ultimately into the advanced position shown in Fig. 1.

Before beginning such forward movement the conveyor 101, the feeder rolls 102, 103 and 104 and the disintegrator cones 189, 190 and 191 are all set in operation. The feeding and cutting teeth 175 on roll 104, assisted by the cones 190 and 191, dig into and load onto plate 110 the relatively easily penetrated coal fragments comprising the bed of cuttings C (Fig. 15), and same are carried upwardly and rearwardly by the conveyor bars. This operation clears a space in the kerf E into which the loading head can be advanced. It will be understood that the maximum height of the loading head (Fig. 6) is preferably less than that of the compressed bed C after the mass B has been shot down, although this is not essential for the reason that the feeder members or loading shafts of the loading head are so designed as to dig and load shot down coal in addition to the machine cuttings. As said advance progresses under the pull of the ropes 267 and 269, the side feeder rolls 102 and 103 also enter the kerf and dig and load onto the conveyor 101 the parts of the bed C lying along the sides of the advancing head 10, thereby facilitating its advance through said bed and kerf.

As the loading head is so advanced along the path continuously being cleared for it by the feeding or conveying action of the feeders, the support provided for the overhanging mass B is progressively removed. Consequently the large coal lumps and other fragments making up that mass will fall of their own weight onto the upper surface of the loading head conveyor 101, as shown in Fig. 15. In some cases, though rarely, it may be necessary to loosen an arched or relatively solid portion of mass B with a hand pick to facilitate its cascading onto the conveyor. Thus the loading head will quickly and steadily advance until it reaches the solid wall I and all the broken coal in the kerf and above the rectangular space occupied by the head and for some little distance on either flank thereof will have been loaded out to the waiting receptacle by the action of the series of conveyor units 10, 20, 30 and 40 (Fig. 4—a).

When the coal overlying said rectangular area has been fully loaded out, then it will be practicable to begin to load out the coal in the right-hand half of mass B as shown in Figs. 1 and 16. For this purpose it is desired to swing the loading head 10 gradually toward the right, while simultaneously advancing the entire loader forwardly along the track 5 to the extent necessary to ultimately bring the loading head by forward and turning movements into the position shown at the extreme right-hand of Fig. 1 and Fig. 16. This operation is performed by a series of advancing and turning movements permitted by the rotation of the loading head 10 and its rear extension 20 about the pivot 220. For the purpose of effecting such movements the jack J—1 is removed so that the pull exerted from jack J—2 operates directly upon the side bracket 265 and its sheave 266. Also, jack J is removed and advanced to the position J—3, the rope 269 being attached thereto and run directly from the drum 256. This rope arrangement induces a lateral pull upon the loading head causing same to swing gradually to the right as the loader is advanced forwardly so that the end of the loading head tends to follow the face I of the solid coal and to sweep thereacross and around through the successive positions shown in Fig. 16. During such movements the side feeder roll 102 will gather fragments from the floor and cuttings bed into the interplate space and the path of the lower reach of the conveyor, while the undermined mass of shot coal above will progressively fall out the top plate and reach of the conveyor.

After the coal has been loaded out in the right-hand half of the mass B, the same operation is repeated in the opposite sense toward the left to load out the other half of the mass, as indicated in Fig. 1. In this operation jack J—3 will be moved to position J—4 and jack J—2 to the proper position to the right of that occupied by J—3 (Fig. 16).

The use of ropes and jacks to effect all loading and operational movements of the mobile loader is important because it provides the necessary power to turn and translate the loading head into and through the material. This function could be effected, very inadequately if at all, by the drive of the track wheels 304 because it is impossible to provide sufficient traction in that manner. However, it will be noted that the loading head can be advanced or projected into shot-down coal, such as the mass B, without having to set up or make place for any jacks in areas beyond where coal has been loaded out. That is the loading head is, by the arrangements shown and described, projected first into the coal to be loaded ahead of any jack or other apparatus set up to pull it thereinto. Similarly the loading head is turned through its arcuate lateral loading operations by pull exerted on the sheave brackets 265 and 268, which brackets are located well to the rear of the forward end of the loading head. This arrangement obviates setting up any jack or other support or apparatus ahead of the actual loading movements of the loading head and thus makes it possible to project the loading head into a shot-down mass and clear out the coal in that mass without any advance jacking, timbering or other preparatory operations.

By following the outline of the loading head 10 through its successive loading positions, it will be noted that all of the shot-down coal in the width of the 24 ft. place has been loaded out, during which operations the loading head 10 has remained entirely within the shot-down coal area B and thus timbering is possible within 6 inches to 1 foot of the face F of the shot-down mass of coal. The only change from the conventional arrangement required by the plan of close timbering shown in Fig. 1 is the moving of props 8 one foot from their usual positions as previously described.

It will be apparent from the foregoing that the loading head 10 is adapted to travel easily and relatively rapidly through the kerf E because the compacted bed C is comprised of fragments relatively small in size and of homogeneous content which present a readily penetrated mass to the action of the feeder members. Moreover it will be noted that all of the shot-down coal constituting the fragmented mass B is supported above the loading head by the bed C so that in loading said coal always falls downward onto the conveyor 101. Consequently practically none of the lumps of coal are ever lifted or elevated during their removal from the mass B. This feature of the invention not only affords the minimum handling of said lumps during the loading operation (thereby minimizing degradation thereof) but it also prevents their coming in contact with the mine floor and so avoids the contamination thereof which frequently results from intermingling with rock and dirt particles adjacent the floor.

Due to the ability of the loading head to take on coal lying on both sides and the front end of said head, a large floor area is quickly covered and loaded out with the minimum travel of the head. It will be noted further that the coal carried rearwardly by the conveyor 101 is maintained at a low level throughout its travel, the only elevation thereof being that necessary to deliver same from the rear end of the conveyor 101 onto the central conveyor unit and thence onto the rear conveyor unit 40. Each of these elevations is, by virtue of the low height characteristics of the machine as a whole, of the lowest possible extent and in practice we have found that no piece of coal will be raised more than 12½ inches above the floor of the mine throughout its travel on the mobile loader.

After the coal in the shot-down area B has all been loaded out the mobile loader is moved back into the position shown in Fig. 1 and its pony truck placed under the loading head in one of two ways:

(1) Either the loading head is raised sufficiently by use of ropes 267 and 269 to permit the pony truck to be rolled thereunder by hand; or
(2) The pony truck is blocked on the track and by moving the mobile loader rearwardly its loading head is pulled onto the pony truck due to the sloping bottom plate 112, Fig. 4—a.

The mobile loader is now ready to be moved by traction drive to another place.

In Figs. 12–14 are shown various typical conditions of mine bottom to which the loading head 10 of our mobile loader is designed to adapt itself so as always to lie flat in conformity with the bottom of the seam throughout the length of said head. These views are highly diagrammatic and are intended to emphasize certain operational features without regard to details of the structure already disclosed. Fig. 12 shows the bottom K beneath the kerf pitched forwardly and upwardly with respect to the bottom L on which the track 5 is mounted. As will be seen the transverse hinge 130 permits the forward part of conveyor unit 20 to slope downwardly toward the floor beyond the tracks, while the hinge 140 permits the loading head 10 to slope upwardly along the pitched bottom K. Similarly said plurality of hinges permits the loading head to adapt itself equally well to the opposite condition shown in Fig. 14, where the pitch of the bottom K is downward and forward with respect to the floor L.

It will be understood that in both such cases, as in others, the bottom K may also be pitched transversely, whereupon the axial swivel 149 permits the loading head 10 to conform to such transverse pitch, as shown for example in Fig. 5. It will be clear that by these means the loading head will in general be enabled automatically to follow and conform to any direction or irregularity of the mine bottom it may encounter. The freely swiveled head 10 is preferably of such length (about six feet) as conforms to the length of kerf cut by the cutting machine, and within such length the pitch of the bottom will normally be uniform because of the rigidity of the cutter bar.

By virtue of the foregoing, the feeder rolls 102, 103 and 104 will always be in functioning position throughout their length and will thus permit the loading of coal to the full capacity of the head at all times, both broadside and at the front thereof. This feature is of great importance in the mining of thin seams when the amount of coal above any unit area of the bottom is relatively small.

It will be understood that these aspects of the invention are important and applicable regardless of whether the kerf be cut at the bottom of the seam or at the top. In some cases the formation of the roof may dictate the cutting of the kerf at the top, as when the roof material is soft or weak for a distance above the true coal seam and therefore would tend to fall with the coal when the seam is undercut. Because of the novel ability of our loader to operate in a shot-down area while permitting very close timbering up to and along the shot-down face, bottom cutting is possible with a relatively weak roof because of the additional support provided by such close timbering but when the roof is too weak nevertheless, the close timbering permitted is naturally advantageous in providing support for such a roof.

Figs. 14, 21 and 22 illustrate that phase of the invention wherein greater coal transportation capacity is afforded in rooms by providing trackways or passageways of greater height than the coal seam being mined in order to accommodate large capacity cars to receive coal from the discharge unit 40 of the loader. In operations on a thin seam 30 inches or less in height, the head room provided by loading out the seam itself is insufficient to accommodate cars of sufficient capacity to handle the loader output. The law as well as the use of main-line haulage locomotives require that top or bottom material be removed in headings or haulage-ways so as to make height in addition to the coal seam height; however, in thin-seam rooms the law does not so require, and, because of the cost of making height in addition to the seam height in rooms, such a procedure has not been heretofore adopted in connection with the use of mobile coal loading equipment. This phase of the invention makes it possible to bring regular large size haulage-way cars into and along the rooms and load the shot-down coal directly into them while using our mobile loader. This operation entails the removal of a relatively narrow strip of top or bottom rock, that is merely along that part of the room occupied by the trackway or passageway for the mine cars and the carriage of the loader.

The novel construction and operation of our mobile loader makes it possible to provide such additional height along the central trackway or passageway in a mine room of average width (such as the 24 foot wide rooms herein described) and, operating the loader from such heightened passageway, load out all of the coal across the entire room, the loading head operating at the seam height and wholly within the shot-down area B of the seam as previously described. By confining the removal of the bottom or top rock to the relatively narrow strip corresponding to said trackway or passageway, the capacity of the coal transporting cars is very greatly increased without a substantial increase in the cost of the mining operation. That is, by taking up bottom rock to a depth of at most say 12 inches below the seam bottom for a width of say 4 feet along the central trackway space in a room about 24 feet wide, our loader makes it possible to load out all the shot-down coal for the entire width of the room, the loader head operating on the normal seam bottom throughout that width while the other parts of the loader stay in the depressed trackway and deliver the loaded coal to the large cars on such track. Similarly an equivalent operation may be performed by removing a like amount of the top rock where that is more desirable or feasible under the particular mining conditions encountered, and in such case the flexible construction of our loader enables it to take out all the coal within the seam-height shot-down area without interference or difficulty.

Figs. 14, 21 and 22 illustrate an operation of the type referred to. Fig. 14 shows how the hinged construction of the units 10 and 20 enable the loading head 10 to conform throughout its length and width to a "bench" formation where the mine bottom 1' at the trackway has been lowered below that of the seam bottom K—1. Fig. 21 illustrates the manner in which the head is brought into such operating position, further illustrating how the loading head would function where the seam bottom K—2 has a longitudinal pitch as shown. To enable the loading head to reach and travel along the elevated seam bottoms K—1 and K—2 a modified form of pony truck is utilized. This modification of the pony truck construction is shown in Figs. 19 and 20.

The pony truck 500 shown therein is essentially the same as that of Figs. 9, 10 and 11 except for the mounting of the loader head supporting rollers 510 and 511. In accordance with the invention these rollers are mounted so that they may be elevated, either together or independently of each other, to levels above that normally occupied as in Fig. 11. By this feature of the invention it is possible to support the loading head at any desired level above the normal track height and to incline the head longitudinally at any desired angle. One suitable construction for this purpose is shown in Figs. 19 and 20 but it will be understood that the invention is not limited thereto as other equivalent mechanical arrangements may be provided. Referring to the roller 511, for example, same is normally mounted with its end journal bearings 512 and 513 resting on the upper surfaces of supporting brackets 514 and 515 respectively. A U-shaped vertical guiding channel 516 rises from the bracket 514 and slidingly engages the end of the journal 512. A similar channel 517 is provided for the journal 513. Pulleys 520 and 521 are mounted at the tops of the channels 516 and 517 respectively, while similar pulleys 522 and 523 are mounted below their respective channels on the depending portions of the brackets 514 and 515. The embodied means for elevating the roller 511 comprises cables 524 and 525 which are threaded through the respective sets of pulleys and engage eye bolts 526 and 527 fixed in the upper surfaces of the journal boxes 514 and 515. The opposite ends of said cables are reeved in opposite senses about a central winding drum 530 rotatably mounted below the plate 276 of the truck on a cross shaft 531 by means of rotatable sleeve 533. A ratchet wheel 532 is provided at the end of said drum 530 to rotate therewith and same is held at any selected position by pawl 534. A squared shank 535 projects from the ratchet wheel to permit turning of the drum by means of a suitable crank.

Without further description it will be apparent that identical construction is provided for independently raising and lowering the other roller 510. The cable winding drum 540 therefor is independently rotatable on shaft 531. Hence both rollers may be elevated to any desired level independently of each other and held there by their respective ratchet means.

Referring again to the operations illustrated in Figs. 14 and 21, it will be seen that the pony truck 500 is preferably placed below the loading head 10, generally intermediate the front and rear ends thereof, and the supporting rollers 510 and 511 thereof are elevated by the means previously described so as to bring the forward end of the head 10 just above the lip T of the seam bottom K—2. When so positioned the head can then be moved forward by jacks and ropes in the usual manner so as to enter the mass B of shot-down coal resting on the bottom K—2. As the loader is projected forwardly the bottom thereof will travel over the rollers 510 and 511 which afford support for the loading head until sufficient of its length rests upon the seam bottom K—2 as to insure that it will continue to move therealong in conformity with the pitch of said bottom. As will appear from Fig. 21, the rear roller 511 of the pony truck will be raised to a level above that of the forward roller 510 so as to impart the proper initial inclination to the head 10. When the head 10 has advanced far enough to establish its support and position upon the seam bottom K—2, the rollers 510 and 511 of the pony truck may be lowered and the truck rolled back to its usual position adjacent the carriage of unit 30, as shown in Fig. 4—b, for example.

It will be understood that the pony truck may be used in a similar manner for the condition illustrated in Fig. 14, except that the rollers 510 and 511 will be elevated equal amounts because of the fact that the bottom K—1 is level. It will further be understood that after the loading head has been advanced forwardly into the position indicated in Fig. 14 (i. e. equivalent to the central, advanced position shown in Figs. 1 and 4—a), thereafter the loading head may be moved laterally and diagonally forwardly to load out the entire width of the square shot-down face across the room at both sides thereof, as indicated in Figs. 1 and 16. Throughout this entire operation the remaining units of the loader stay substantially within the trackway area, which is of the greater height previously described.

In Fig. 22 there is also shown the manner in which the loader may be used for "gobbing" or stowing away rock which has been drilled and shot either from the top or bottom in advance of the trackway 5 preparatory to shooting down and loading the next forward mass of coal B in the room. It will be understood that after the loader has cleared away all the shot-down coal lying on a bottom K—1 (Fig. 14), for example, the loader will be temporarily withdrawn and the cutting machine 600 (Fig. 18) brought into position on the bottom K—1 to cut the next advance kerf in the solid face I. The cutting machine will then be withdrawn and that part R of the rock bottom K—1 lying ahead of the trackway 5 will be drilled and shot to a width and depth equal to that of said trackway. Then the loader will be again moved into loading position and the loading head will be advanced at the level of the track bottom in the usual way by ropes and jacks straightforward into the shattered mass of rock R ahead of it. In this manner the loading head may be utilized promptly to load out and clear the depressed space in advance of the trackway. It will be understood that the loader may be used in the same manner to remove rock shot from the top of the mine, above and in prolongation of the trackway, when the desired additional height is obtained in that manner instead of by removing bottom rock.

After the bottom or top rock has been drilled and shot as described, the rear discharge conveyor 40 may be used to gob or stow the rock loaded in the manner just described. As will be clear from the previous description the rear, upwardly inclined conveyor 40 (Fig. 4—b) is rotatable about the vertical axis 401 so that it may be set at any desired horizontal angle with respect to the trackway 5 and the intermediate conveyor unit 30. Hence by turning the discharge conveyor 40 as shown in Fig. 22, for example, the rock loaded out by the loading head 10 may be promptly disposed to the sides of the track to form the gob usually produced by hand operations. Wherever necessary, props 7 may be temporarily removed to permit the conveyor 40 to enter and turn through spaces in the room at the sides of the trackway.

The invention also provides means, preferably permanently attached to the loading head itself, for selectively guiding same and determining the operating angle thereof under different conditions of the mine bottom pitch and transverse slopes. Referring, for example, to the condition illustrated in Fig. 13, it will be understood that the slope followed by the loading head 10 in travelling along the pitched bottom K may best be maintained by elevating the rear portion thereof adjacent the hinge point 140, thereby to prevent the head from travelling through the coal on a normally level course. Likewise it is desirable to be able to impart an initial sidewise or transverse tilt to the head wherever the mine bottom conditions require.

For these purposes we provide the construction shown in Figs. 23 and 24. As there shown a transverse supporting track or runner 650 is mounted beneath the base plate 110 of the loading head preferably just forward of the hinge 140 and thus slightly to the rear of where the plate 111 begins to incline upwardly. Said runner 650 is fixed near either end thereof to vertical threaded rods 651 and 652. These rods extend upwardly through relatively wide circular openings 653 in the base plate 111 and are threaded through operating nuts 654 which turn on suitable washers 655 and 656 between the upper surface of the plate 111 and an overlying apertured flange member 657 which is fixed to and projects laterally from the upstanding side walls 116 and 117 of the loading head. Thus the turning of the nuts 654 will depress the runner 650 and correspondingly elevate the loading head at that point above the mine bottom. It will also be clear that by turning one nut more than the other a sidewise tilt may be imparted to the loading head within the angular freedom permitted by the enlarged openings 653 in the plate 111 and the corresponding opening 660 in the overhead flanges 657. In normal level operations such as shown in Fig. 4—a for example it will be understood that the runner 650 will be drawn up flush with the bottom surface of the plate 111 and thereby normally clear from contact with the mine floor. This construction is particularly helpful in holding the head at the proper slope and tilt when it is being moved angularly toward the side portions of the coal mass at a face; also in the case where the bottom suddenly pitches, as sometimes occurs with a sharply rolling bottom.

While in the foregoing, application of the invention to the mining and loading out of a face of coal in an advancing room has been illustratively described, it will be understood that the mobile loader of our invention and the operation of the method herein disclosed are equally applicable to other mining operations in mines of the type described, particularly those wherein the room and pillar system is employed. For example, the loader may be utilized in making crosscuts, in retreating pillar removing operations and in fact in any and all of the mining operations customarily employed in said room and pillar system. This versatility of operation is largely a result of the maneuverability of the units of the machine around and into various parts of the mine and with respect to each other. That is, the loading head can be swung through a very wide angle with respect to the middle unit 30 and also the rear unit 40 can be swung similarly so that the apparatus as a whole can be positioned and operated in virtually any angular relation to be found in any of the various mining operations. Moreover it will be understood that the loader need rarely be idle because it can be readily moved from one room or place to another over the usual track system in the mine, so that while the kerf-cutting machine is preparing a face in one room, the loader may be used in its phases of the operations in another room and vice versa.

The invention in its broader aspects is not limited to the specific mechanisms shown and described but departures may be made therefrom within the scope of the accompanying claims without departing from the principles of the invention and without sacrificing its chief advantages.

What we claim is:

1. A mobile coal loader including, in combination, a relatively long and narrow frame of low vertical dimension and an endless conveyor mounted lengthwise of said frame, the upper reach of said conveyor overlying the lower surface reach and means for driving said conveyor so that its upper reach travels rearwardly lengthwise of said frame, a mobile support for the rear portion of said frame, said frame being hinged transversely between the support and the front end of the frame and being angularly movable about an axis substantially coincident with its longitudinal axis whereby the forward portion of said frame may lie on the mine floor in conformity with the fore-and-aft and transverse pitches thereof.

2. A mobile coal loader including, in combination, a relatively long and narrow frame of low vertical dimension and an endless conveyor mounted lengthwise of said frame, the upper reach of said conveyor overlying the lower reach thereof and means for driving said conveyor so that its upper reach travels rearwardly lengthwise of said frame said frame extending for the full length of said conveyor, a mobile support for the rear portion of said frame, said frame being pivotally articulated between the support and the front end of the frame for transverse angular movements whereby the forward portion of said frame may lie on the mine floor in conformity with longitudinal pitches thereof, said forward portion of the frame also being angularly movable about an axis substantially in line with its longitudinal axis to permit it to lie in conformity with transverse pitches of the mine floor.

3. A mobile coal loader including, in combination, a relatively long and narrow frame of low vertical dimension and an endless conveyor mounted lengthwise of said frame, the upper reach of said conveyor overlying the lower reach thereof and means for driving said conveyor so that its upper reach travels rearwardly lengthwise of said frame, a mobile support for the rear portion of said frame, said frame extending the length of the conveyor and being hinged transversely in two places and also being mounted for axial pivotal movement relative to the support so as to tilt transversely relative thereto, the portion of said frame in front of the second hinge constituting a loading head adapted throughout its length to lie flat on the mine floor in conformity with the pitch thereof.

4. A mobile coal loader including, in combination, a loading head designed to enter the kerf space beneath a mass of shot-down coal, said head comprising a relatively long and narrow frame of low vertical dimension and a flexible conveyor mounted lengthwise of said frame, the upper surface of said conveyor overlying the lower surface thereof, means for driving said conveyor so that its upper surface travels rearwardly lengthwise of said frame, a mobile support for the rear portion of said conveyor, the conveyor being angularly movable about a substantially vertical axis on said support and means for imparting forward and angular movements to said head comprising power driven rope drums on the support and connections on the head for ropes from said drums, said connections being positioned intermediate the support and the front end of the head whereby lateral angular movements may be imparted to said head through said connections by pull on said ropes when the ends thereof are fixed at points rearward of the front end of said head.

5. A mobile coal loader including, in combination, a loading head designed to enter the kerf space beneath a mass of shot-down coal, said head comprising a flexible conveyor mounted lengthwise of said head, the upper surface of said conveyor overlying the lower surface thereof, means for driving said conveyor so that its upper surface travels rearwardly, a support for the rear end of said conveyor, said head being angularly movable as a whole about a substantially vertical axis on the support, and a belt conveyor mounted lengthwise of the support and having its upper surface travelling rearwardly lengthwise of said support in the same sense as the travel of the loading head conveyor, said support conveyor being substantially wider than the loading head conveyor to receive directly material delivered to it from the loading head conveyor through a relatively wide turning angle of the latter.

6. In a mobile coal loader, in combination, a loading head designed to enter the kerf space beneath a mass of shot-down coal, said head comprising a relatively long and narrow frame of low vertical dimension and a conveyor mounted lengthwise of said frame, the upper surface of said conveyor overlying the lower surface thereof, means for driving said conveyor so that its upper surface travels rearwardly lengthwise of said frame, a mobile support for the rear portion of said conveyor, a rotatable coal digging and conveying roll extending along one side edge of the head, a similar roll along the opposite side edge of the head, a third roll extending across the front end of the head and having driving engagement with both said side rolls, and independent power means for driving the rear ends of each of said side rolls.

7. In a mobile coal loader, in combination, a loading head designed to enter the kerf space beneath a mass of shot-down coal, said head comprising a relatively long and narrow frame of low vertical dimension and a conveyor mounted lengthwise of said frame, the upper surface of said conveyor overlying the lower surface thereof and means for driving said conveyor so that its upper surface travels rearwardly lengthwise of said frame, a coal digging and conveying member extending adjacent an edge of the conveyor, said member comprising a rotatable roll having radially projecting members designed to enter and gather particles of a mass of coal lying in its peripheral path and means for rotating said roll to convey the engaged particles onto the lower surface of the adjacent portion of said conveyor.

8. A mobile loader including in combination a loading head movable along the mine bottom into a mass of shot-down coal, said head having superposed conveying means at two levels throughout its length and means for gathering material at the mine bottom onto the conveying means at the lower level.

9. A mobile loader including in combination a loading head movable along the mine bottom into a mass of shot-down coal, said head having superposed conveying means at two levels throughout its length, means for gathering material at the mine bottom onto the conveying means at the lower level, the conveying means at the upper level being disposed to receive material from above the mine bottom.

10. A mobile loader including in combination a loading head movable along the mine bottom into a mass of shot-down coal, said head having superposed conveying means at two levels throughout its length, means for gathering material at the mine bottom onto the conveying means at the lower level, the conveying means at the upper level being disposed to receive material from above the mine bottom, said conveying means being designed to deliver material from both said levels to coal-receiving means at the rear of said head.

11. A mobile loader including in combination a loading head movable along the mine bottom into a mass of shot-down coal, said head having an endless conveyor extending at two levels throughout the length of said head, the upper reach of the conveyor travelling rearwardly and the lower reach travelling forwardly along said head, means for gathering material at the mine bottom onto the lower reach of the conveyor and the upper reach of said conveyor being disposed to receive material at higher levels.

12. A mobile loader including in combination a loading head movable along the mine bottom into a mass of shot-down coal, said head having an endless conveyor extending at two levels throughout the length of said head, the upper reach of the conveyor travelling rearwardly and the lower reach travelling forwardly along said head, means for gathering material at the mine bottom onto the lower reach of the conveyor and the upper reach of said conveyor being disposed to receive material at higher levels, and means for delivering the material gathered at said lower level to the upper reach of the conveyor.

13. In a mobile coal loader a loading head having coal conveying and digging means, said digging means comprising rotatable coal penetrating and gathering members along both sides and the forward end of the conveying means, rotary disintegrating members projecting forwardly from both the rotary side members and similar disintegrator members projecting sidewardly from both ends of the rotary forward member to present a continuity of coal penetrating and rotating surfaces through the operating periphery of the loading head.

14. A mobile loader including in combination a loading head movable along the mine bottom into a mass of shot-down coal, said head having superposed conveying means at two levels throughout its length, and means for gathering material at the mine bottom partly onto the conveying means at the upper level and partly thereon at the lower level.

15. In a mobile loader in combination a loading head movable along the mine bottom, said head having conveying means at two levels, a roller over which conveying means travel from the lower to the upper level, the lower level travelling forwardly and upwardly around said forward roller and thence rearwardly along the upper level, and a rotatable coal digging and gathering roll spaced from said roller and rotating in a sense opposite thereto, whereby said roller and roll cooperate together to elevate material engaged in the shape between their oppositely rotating surfaces.

16. A mobile coal loader including, in combination, an endless conveyor, the rear portion of said conveyor being mounted on a movable support, an intermediate portion transversely hinged for longitudinal angular motion with respect to said rear portion, and a forward loading-head portion similarly hinged to the forward end of said intermediate portion whereby said loading head may lie at various longitudinal pitch angles conforming to the mine floor over which it travels in loading coal, said loading-head portion being tiltable about a longitudinal axis to conform to transverse pitch angles of the mine floor.

17. In a mobile coal loading apparatus, in combination, a relatively long frame of low vertical dimensions, a support for said frame, said frame including a leading section designed to enter a kerf space beneath a mass of shot-down coal and to slide on its own bottom and lie flat on that part of the mine floor beneath said mass in conformity with the pitch of said part of the floor, said leading section including coal digging and conveying devices, an intermediate section pivoted to said leading section on a transverse axis, and a rear section pivotally connected to the intermediate section, the rear end of said rear section being mounted on said support for pivotal movement, and a mobile carriage for adjustably supporting said leading section, said mobile carriage including means for adjusting the elevation and inclination of said leading section whereby to cause said leading section to follow an inclined mine floor.

18. A mobile loader including in combination, a relatively long and narrow frame of low vertical dimensions, a conveyor mounted on said frame, means for driving said conveyor, a support for said frame, said frame including a leading section designed to enter a kerf space beneath a mass of shot-down coal and to slide on its own bottom and lie flat on that part of the mine floor beneath said mass in conformity with the pitch of said part of the floor, said leading section including rotatable gathering means positioned at the forward end thereof for loading the coal on to said conveyor, the vertical height of a major portion of said leading section being of substantially the same height as that of the gathering means, an intermediate section pivoted to said leading section on a transverse axis, and a rear section pivotally connected to the intermediate section, the rear end of said rear section being mounted on said support for pivotal movement.

RICHARD PEALE.
REMBRANDT PEALE, Jr.

REFERENCES CITED

The following references are of record in the file of this patent:

UNITED STATES PATENTS

| Number | Name | Date |
| --- | --- | --- |
| 765,832 | Hamilton | July 26, 1904 |
| 897,893 | Hamilton | Sept. 8, 1908 |
| 1,307,335 | Barger et al. | June 24, 1919 |
| 1,431,857 | Willcox | Oct. 10, 1922 |
| 1,459,524 | Wright | June 19, 1923 |
| 1,498,506 | Buffum | June 17, 1924 |
| 1,752,714 | Wilcox | Apr. 1, 1930 |
| 1,758,198 | Morgan | May 13, 1930 |
| 1,778,595 | Hauge | Oct. 14, 1930 |
| 1,828,751 | Shelburne | Oct. 27, 1931 |
| 1,930,016 | Moore | Oct. 10, 1933 |
| 1,997,589 | Levin | Apr. 16, 1935 |

FOREIGN PATENTS

| Number | Country | Date |
| --- | --- | --- |
| 463,956 | France | 1913 |
| 32,332 | Norway | May 18, 1921 |